US010605997B2

(12) United States Patent
Nakama et al.

(10) Patent No.: US 10,605,997 B2
(45) Date of Patent: Mar. 31, 2020

(54) OPTICAL-FIBER-ATTACHED FERRULE WITH AN UPPER OPENING AND A LOWER VENTILATION HOLE AND METHOD OF MANUFACTURING THE SAME

(71) Applicant: FUJIKURA LTD., Tokyo (JP)

(72) Inventors: Akihiro Nakama, Chiba (JP); Tatsuya Ota, Chiba (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 15/553,526

(22) PCT Filed: Feb. 12, 2016

(86) PCT No.: PCT/JP2016/054054
§ 371 (c)(1),
(2) Date: Aug. 24, 2017

(87) PCT Pub. No.: WO2016/136484
PCT Pub. Date: Sep. 1, 2016

(65) Prior Publication Data
US 2018/0017738 A1 Jan. 18, 2018

(30) Foreign Application Priority Data
Feb. 24, 2015 (JP) ................... 2015-034505

(51) Int. Cl.
G02B 6/38 (2006.01)
G02B 6/32 (2006.01)

(52) U.S. Cl.
CPC ............ *G02B 6/3861* (2013.01); *G02B 6/32* (2013.01); *G02B 6/382* (2013.01); *G02B 6/3821* (2013.01); *G02B 6/3853* (2013.01); *G02B 6/3885* (2013.01)

(58) Field of Classification Search
None
See application file for complete search history.

(56) References Cited

U.S. PATENT DOCUMENTS 5,024,505 A * 6/1991 Fujikawa ............ G02B 6/3801
385/97
5,241,612 A * 8/1993 Iwama ..................... G02B 6/32
385/59
(Continued)

FOREIGN PATENT DOCUMENTS

CN 102313938 A 1/2012
EP 3499284 A1 * 6/2019 ............... G02B 6/32
(Continued)

OTHER PUBLICATIONS

International Preliminary Report on Patentability with Written Opinion for corresponding International Application No. PCT/JP2016/054054, dated Sep. 8, 2017 (8 pages).
(Continued)

*Primary Examiner* — Andrew Jordan
(74) *Attorney, Agent, or Firm* — Osha Liang LLP

(57) ABSTRACT

An optical-fiber-attached ferrule of the invention includes: an optical fiber; and a ferrule that holds an end portion of the optical fiber, where the ferrule includes a ferrule end surface, a fiber hole to insert the optical fiber, an adhesive-filling section that includes an opening surface of the optical fiber hole and an opposed surface opposed to the opening surface, and a light transmitting part that transmits an optical signal between the ferrule end surface and the opposed surface, and an end surface of the optical fiber is disposed close to the opposed surface in the adhesive-filling section The adhesive-filling section is filled with an optical adhesive with Shore hardness D of equal to or less than 50.

14 Claims, 15 Drawing Sheets

(FIRST MODIFICATION)

(FIRST MODIFICATION)

(56) References Cited

U.S. PATENT DOCUMENTS

| | | | | |
|---|---|---|---|---|
| 5,548,677 | A * | 8/1996 | Kakii | G02B 6/262 385/55 |
| 5,719,978 | A * | 2/1998 | Kakii | G02B 6/262 385/50 |
| 5,764,833 | A * | 6/1998 | Kakii | G02B 6/262 385/43 |
| 6,101,306 | A * | 8/2000 | Engstrand | G02B 6/3636 385/137 |
| 7,048,450 | B2 * | 5/2006 | Beer | G02B 6/4292 385/88 |
| 7,510,337 | B2 * | 3/2009 | Takeda | G02B 6/3861 385/65 |
| 9,063,304 | B2 | 6/2015 | Ohta et al. | |
| 9,405,076 | B2 * | 8/2016 | Chen | G02B 6/32 |
| 9,429,717 | B2 * | 8/2016 | Nakama | G02B 6/3861 |
| 2005/0018977 | A1 * | 1/2005 | Beer | G02B 6/4292 385/88 |
| 2011/0317959 | A1 | 12/2011 | Ohta et al. | |
| 2012/0014648 | A1 * | 1/2012 | Duis | G02B 6/3826 385/52 |
| 2012/0057829 | A1 | 3/2012 | Benjamin et al. | |
| 2013/0163936 | A1 | 6/2013 | Ohta et al. | |
| 2014/0219619 | A1 | 8/2014 | Hui et al. | |
| 2014/0270651 | A1 * | 9/2014 | Kadar-Kallen | G02B 6/3861 385/79 |
| 2014/0321814 | A1 * | 10/2014 | Chen | G02B 6/32 385/79 |
| 2015/0023635 | A1 | 1/2015 | Akabane et al. | |
| 2015/0023636 | A1 | 1/2015 | Moriyama et al. | |
| 2015/0198773 | A1 * | 7/2015 | Nakama | G02B 6/3885 385/79 |
| 2018/0017738 | A1 * | 1/2018 | Nakama | G02B 6/3861 |

FOREIGN PATENT DOCUMENTS

| | | |
|---|---|---|
| JP | H4-288509 A | 10/1992 |
| JP | 200255253 A | 2/2002 |
| JP | 2005-173373 A | 6/2005 |
| JP | 201032782 A | 2/2010 |
| JP | 2012-13805 A | 1/2012 |
| JP | 2013-134465 A | 7/2013 |
| JP | 5564344 B2 | 7/2014 |
| JP | 2014-149523 A | 8/2014 |
| JP | 2015-22125 A | 2/2015 |
| JP | 2015-22130 A | 2/2015 |

OTHER PUBLICATIONS

Office Action in counterpart Chinese Patent Application No. 201680009324.9 dated Feb. 22, 2019 (14 pages).

* cited by examiner

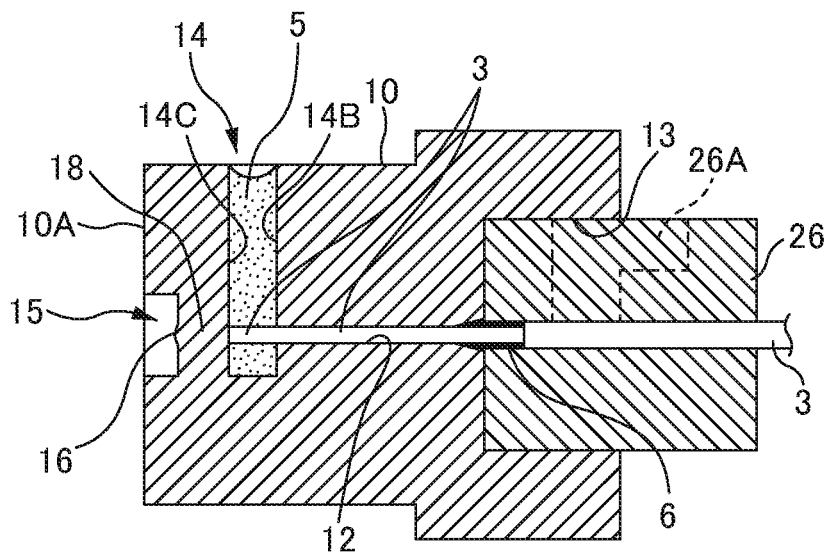
FIG. 11A (THIRD EMBODIMENT)
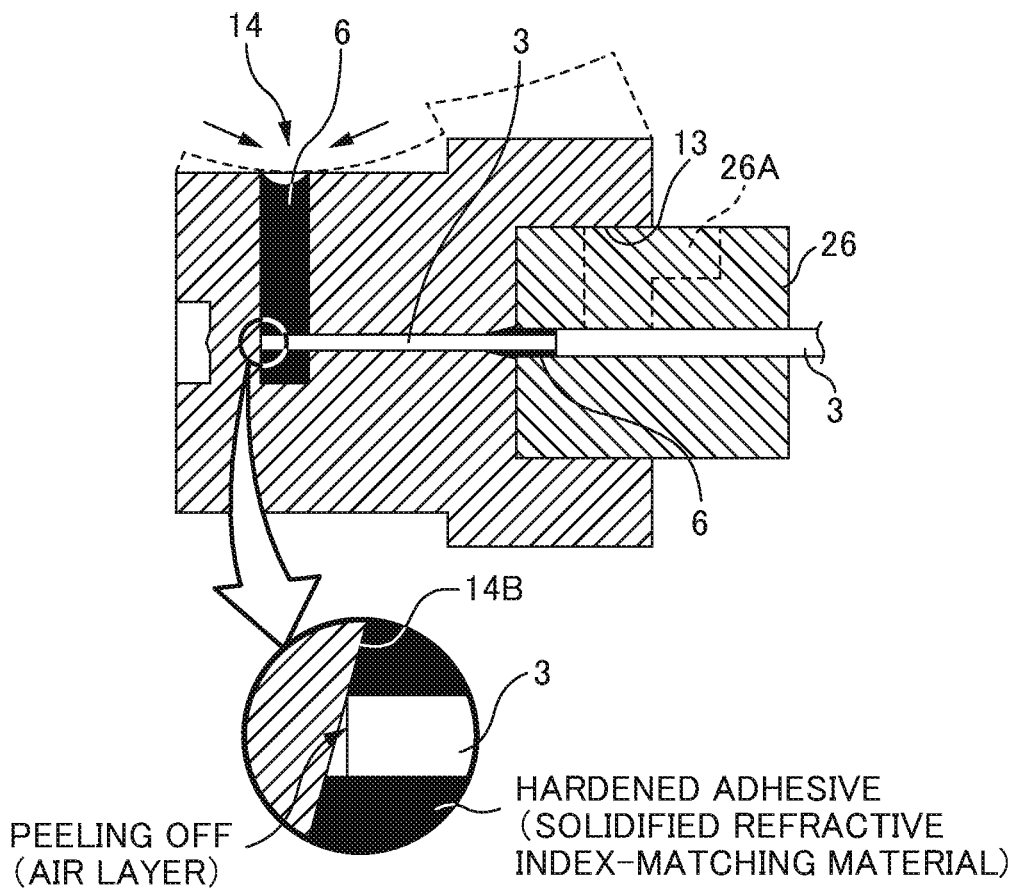
FIG. 11B (COMPARATIVE EXAMPLE)

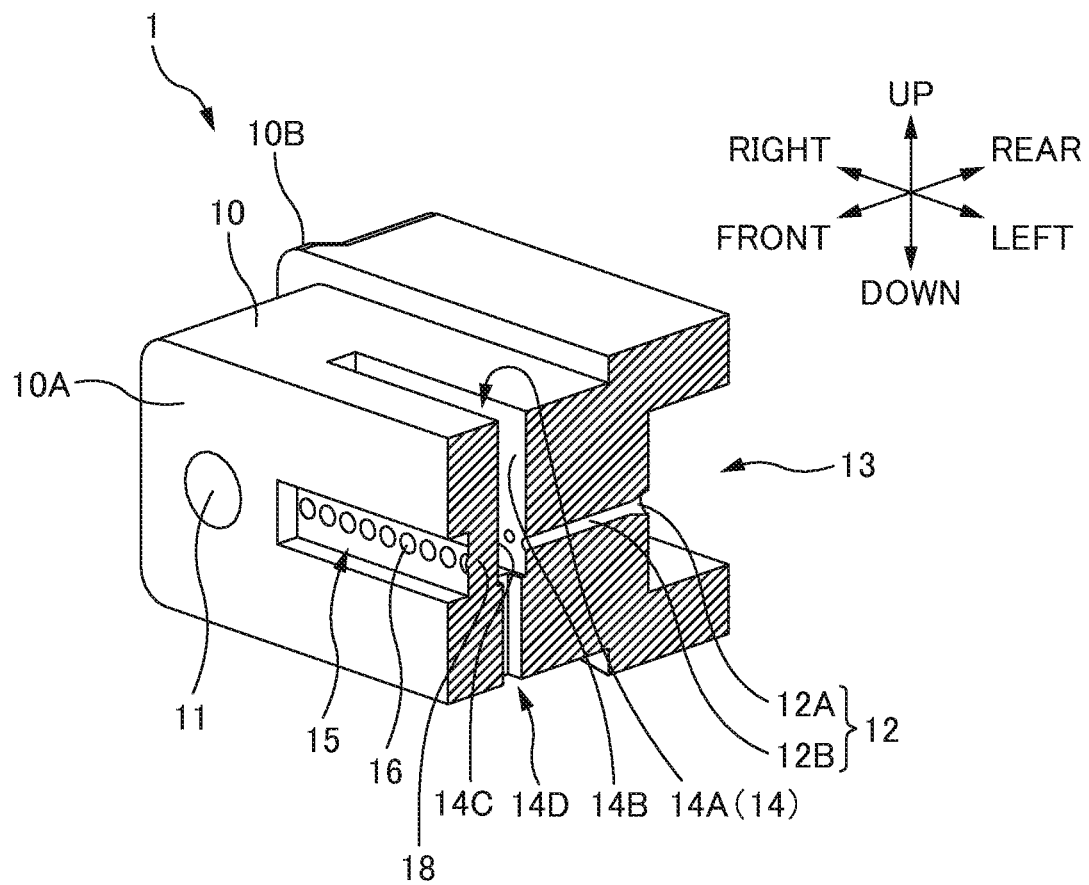
FIG. 13A (FIRST MODIFICATION)
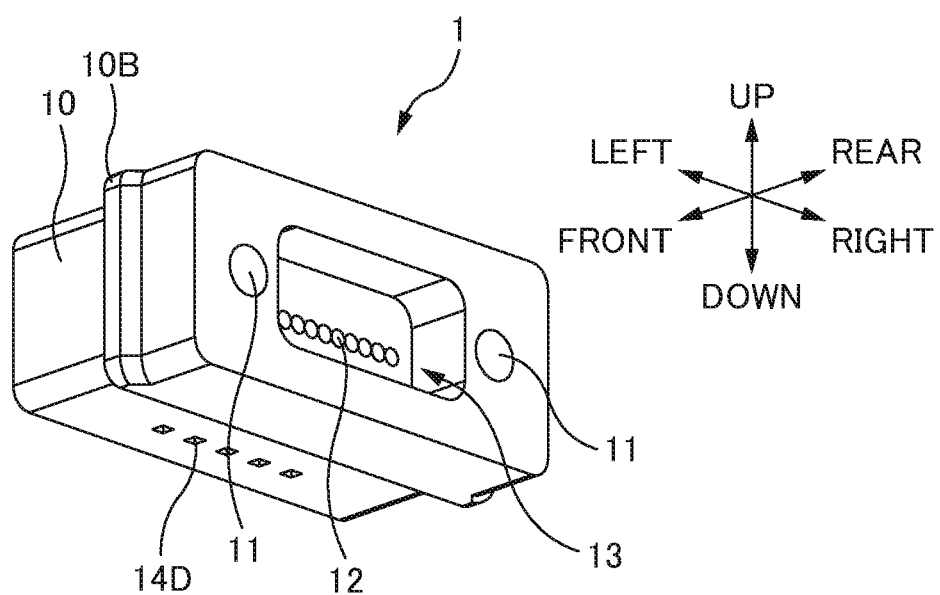
FIG. 13B (FIRST MODIFICATION)

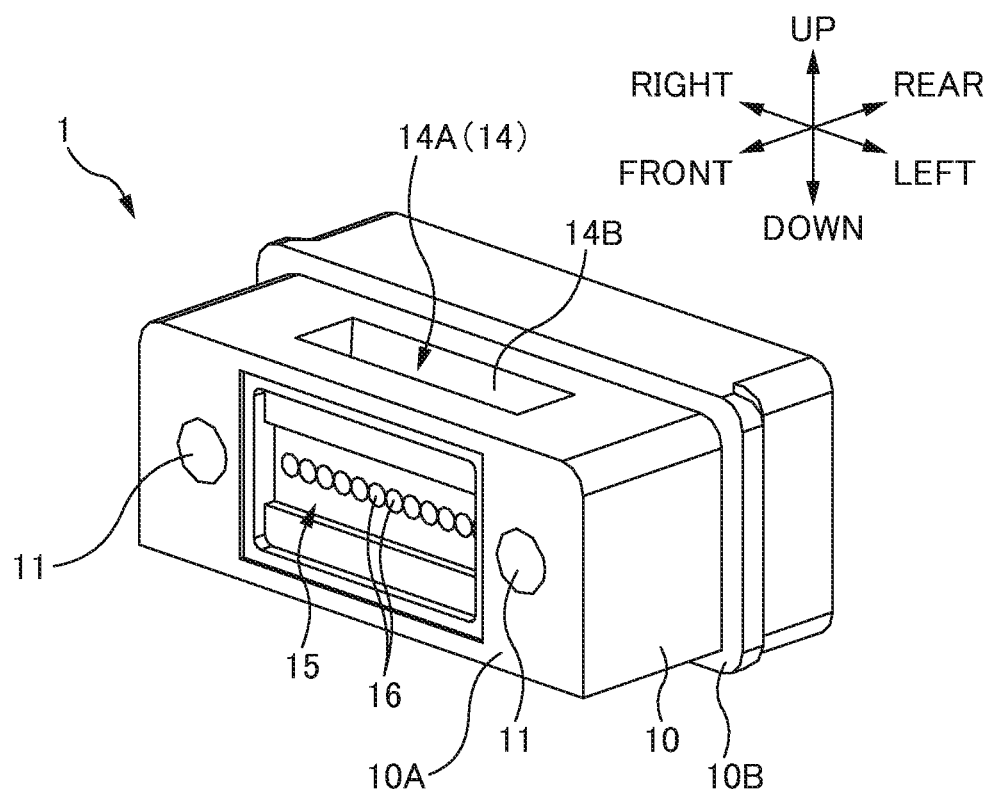
FIG. 14A (SECOND MODIFICATION)
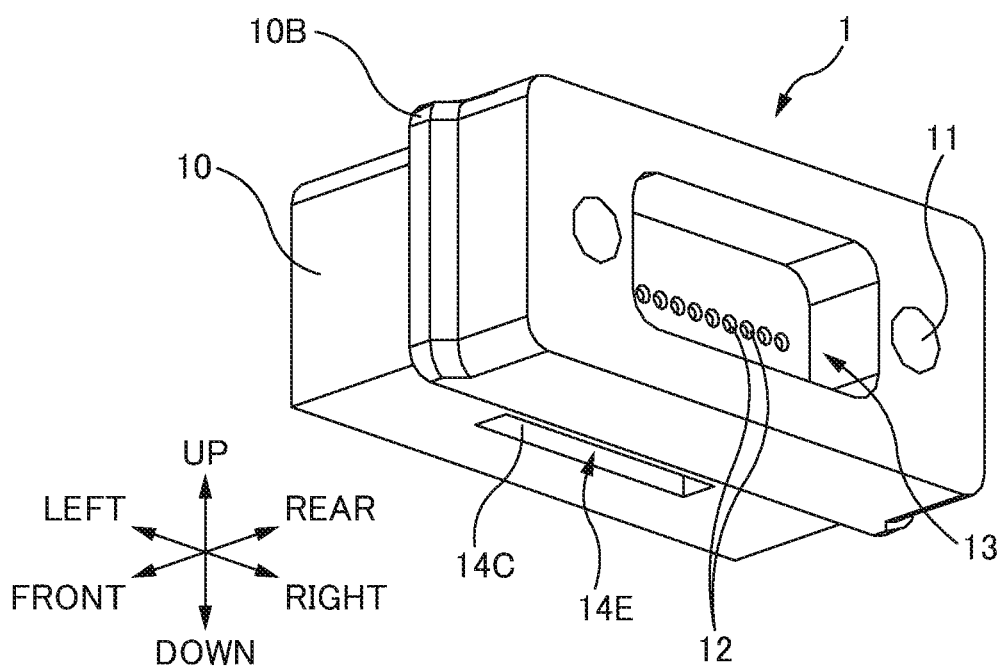
FIG. 14B (SECOND MODIFICATION)

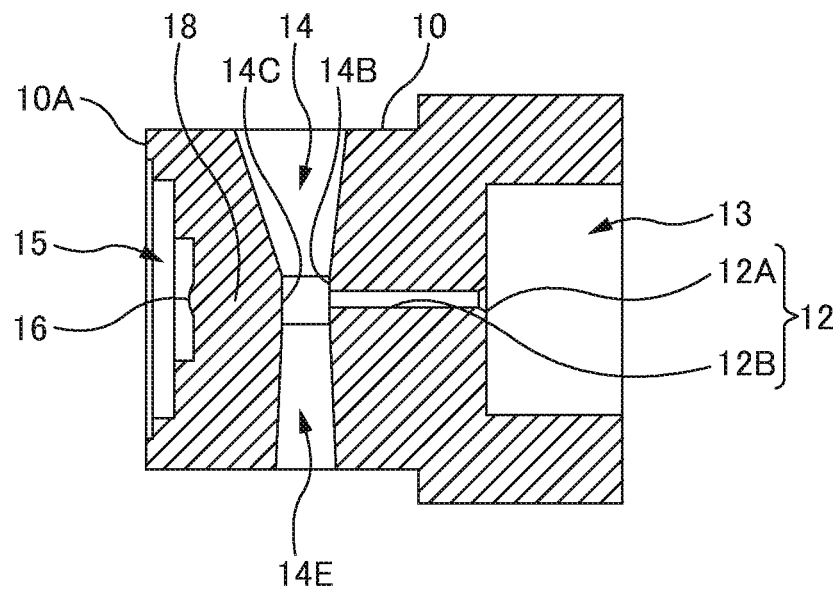
FIG. 15A (SECOND MODIFICATION)
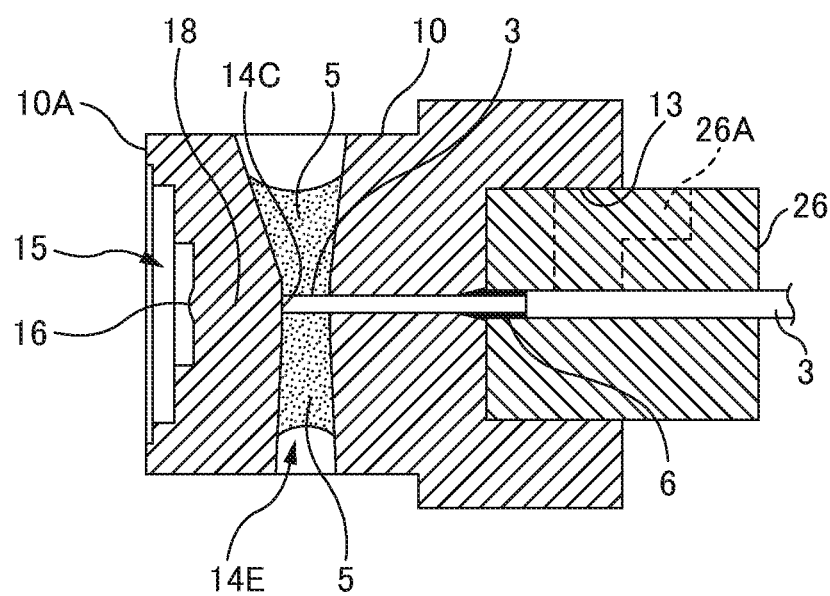
FIG. 15B (SECOND MODIFICATION)

OPTICAL-FIBER-ATTACHED FERRULE WITH AN UPPER OPENING AND A LOWER VENTILATION HOLE AND METHOD OF MANUFACTURING THE SAME

TECHNICAL FIELD

One or more embodiments of the present invention relate to an optical-fiber-attached ferrule and a method for manufacturing the same.

BACKGROUND

As a ferrule to hold end portions of optical fibers, there has been known the following ferrule. The ferrule includes an adhesive-filling section having an opening from which an adhesive is filled. The adhesive is filled with the end surfaces (the distal ends) of the optical fibers caused to abut onto an inner wall of the adhesive-filling section to fix the distal ends of the optical fibers.

CITATION LIST

Patent Literature

Patent Literature 1: Japanese Patent No. 5564344

SUMMARY

A gap is possibly generated between an inner wall of an adhesive-filling section and end surfaces of optical fibers. Such gap possibly generates signal loss of an optical signal.

One or more embodiments of the present invention may reduce the signal loss of the optical signal.

One or more embodiments of an optical-fiber-attached ferrule may include: an optical fiber; and a ferrule that holds an end portion of the optical fiber, wherein the ferrule includes a ferrule end surface, a fiber hole to insert the optical fiber, an adhesive-filling section that includes an opening surface of the optical fiber hole and an opposed surface opposed to the opening surface, and a light transmitting part that transmits an optical signal between the ferrule end surface and the opposed surface, and an end surface of the optical fiber is disposed close to the opposed surface in the adhesive-filling section, the adhesive-filling section being filled with an optical adhesive with Shore hardness D of equal to or less than 50.

Other features of one or more embodiments of the present invention will be made clear by the Description and Drawings described below.

Advantageous Effects of Invention

One or more embodiments of the present invention may reduce signal loss of an optical signal.

BRIEF DESCRIPTION OF DRAWINGS

FIG. 1A and FIG. 1B are drawings illustrating one or more embodiments, and FIG. 1C is a drawing illustrating a comparative example.

FIG. 11A is a cross-sectional view of a fiber-attached ferrule of one or more embodiments. FIG. 11B is a cross-sectional view of a comparative example.

FIG. 13A is a cutaway perspective view of the ferrule 1 of a first modification of one or more embodiments. FIG. 13B is an overall perspective view of the ferrule 1 of the first modification of one or more embodiments.

FIG. 14A and FIG. 14B are overall perspective views of the ferrule 1 of a second modification of one or more embodiments.

FIG. 15A is a cross-sectional view of the ferrule 1 of the second modification of one or more embodiments. FIG. 15B is a cross-sectional view of the fiber-attached ferrule 1 of the second modification of one or more embodiments.

DETAILED DESCRIPTION

Figure 1A:
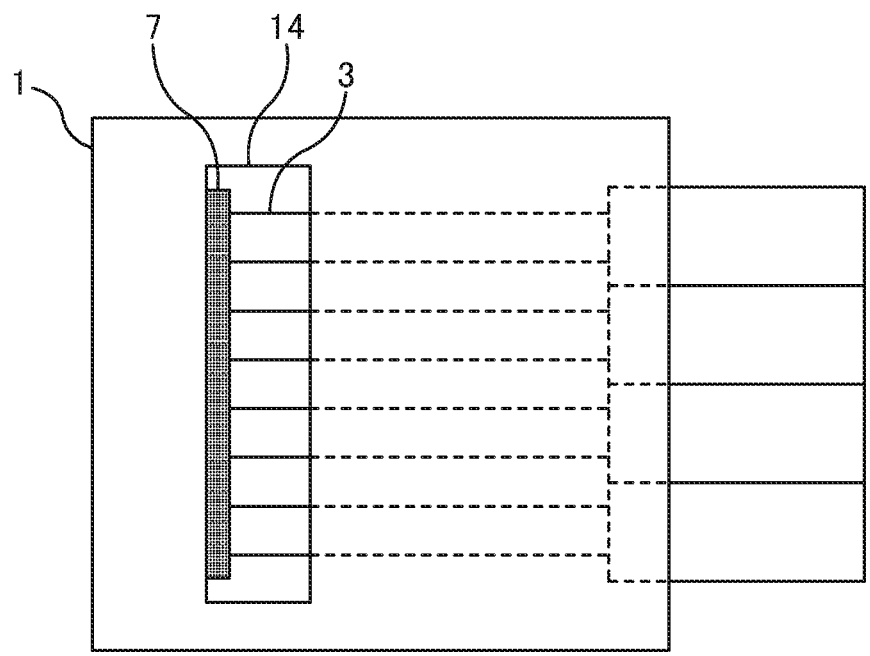
FIG. 1A to FIG. 1C are explanatory diagrams of an outline of a ferrule of one or more embodiments.

The following matters will be made clear from the descriptions of Description and Drawings below.

An optical-fiber-attached ferrule, may include: an optical fiber; and a ferrule that holds an end portion of the optical fiber, wherein the ferrule includes a ferrule end surface, a fiber hole to insert the optical fiber, an adhesive-filling section that includes an opening surface of the optical fiber hole and an opposed surface opposed to the opening surface, and a light transmitting part that transmits an optical signal between the ferrule end surface and the opposed surface, and an end surface of the optical fiber is disposed close to the opposed surface in the adhesive-filling section, the adhesive-filling section being filled with an optical adhesive with Shore hardness D of equal to or less than 50. Such optical-fiber-attached ferrule can reduce signal loss of the optical signal.

The adhesive-filling section may have a depth equal to or more than a half of a thickness of a ferrule body section. The optical-fiber-attached ferrule is especially effective in such case.

The optical fiber is fixed to the fiber hole with an adhesive that may be different from the optical adhesive. The adhesive to fix the optical fiber to the fiber hole may be harder than the optical adhesive. The adhesive to fix the optical fiber to the fiber hole may have a difference in refractive index of the adhesive to fix the optical fiber to the fiber hole and refractive index of the optical fiber is larger than a difference in refractive index of the optical adhesive and refractive index of the optical fiber.

The optical-fiber-attached ferrule may include a recess site recessed with respect to the ferrule end surface and lens sections formed at the recess site. Each of the lens sections may be disposed corresponding to each of the optical fiber holes. This allows enhancing durability even when attachment and removal are repeated.

The optical signal may have a diameter at the recess site reduced thinner than a diameter of the optical signal at the lens section. The diameter of the optical signal may become larger with increasing separation compared with a distance to a lens section on a ferrule on another side. This features good optical property during coupling with a connector and can reduce damage to eyes by light during no coupling with the connector.

The ferrule end surface may include an elastic member surrounding the recess site. This closely seals the lens sections when the ferrules are mutually coupled, thereby ensuring preventing a water droplet from attaching to the lens sections even if humidity changes.

The adhesive-filling section may have a ventilation hole. Accordingly, an air bubble is less likely to be formed during the filling of the adhesive.

The adhesive-filling section may have an opening at a bottom. The adhesive-filling section may penetrate the ferrule. This ensures reducing a deformation of the ferrule.

The following method of manufacturing an optical-fiber-attached ferrule becomes apparent. The method includes (1) preparing a ferrule that includes a ferrule end surface, a fiber hole, an adhesive-filling section that has an opening surface of the fiber hole and an opposed surface opposed to the opening surface, and a light transmitting part that transmits an optical signal between the ferrule end surface and the opposed surface; (2) inserting an optical fiber into the fiber hole to cause an end surface of the optical fiber protruding from the opening surface to come close to the opposed surface; and (3) filling an optical adhesive with Shore hardness D of equal to or less than 50 in the adhesive-filling section. Such a manufacturing method can reduce transmission loss.

The method may fix the optical fiber to the fiber hole with an adhesive while the end surface of the optical fiber is caused to come close to the opposed surface, and may subsequently fill the optical adhesive in the adhesive-filling section. This facilitates work to fill the optical adhesive in the adhesive-filling section.

The following matters will be also made clear by the Description and Drawings described below.

The following ferrule becomes apparent. The ferrule holds end portions of optical fibers. The ferrule includes a ferrule end surface, fiber holes into which each of the optical fibers are inserted, an adhesive-filling section, a light transmitting part, and a sheet-shaped solid refractive index-matching material. The adhesive-filling section has an opening from which an adhesive is to be filled. The adhesive-filling section internally includes an opening surface of the optical fiber hole and an opposed surface opposed to the opening surface. The light transmitting part transmits an optical signal between the ferrule end surface and the opposed surface. The sheet-shaped solid refractive index-matching material is disposed on the opposed surface of the adhesive-filling section. The sheet-shaped solid refractive index-matching material deforms a surface when the end surfaces of the optical fibers are caused to abut onto.

Since such a ferrule causes the end surfaces of the optical fibers to abut onto the sheet-shaped solid refractive index-matching material, the gap can be reduced. This ensures preventing the air bubbles during the filling of the adhesive, allowing reducing the signal loss of the optical signal.

Both surfaces of the sheet-shaped solid refractive index-matching material have viscosity. This ensures reducing the signal loss of the optical signal at a temperature change.

Shore A hardness and a thickness of the solid refractive index-matching material may be within a range surrounded by four points, a point with the Shore A hardness of 0 and the thickness of 30 μm, a point with the Shore A hardness of 70 and the thickness of 30 μm, a point with the Shore A hardness of 70 and the thickness of 50 μm, and a point with the Shore A hardness of 0 and the thickness of 150 μm. This ensures reducing the gap with more certainty.

The ferrule may include a recess site recessed with respect to the ferrule end surface and lens sections formed at the recess site. Each of the lens sections may be disposed corresponding to each of the optical fiber holes. This allows enhancing durability even when the attachment and removal are repeated.

The optical signal may have a diameter at the recess site reduced thinner than a diameter of the optical signal at the lens section. The diameter of the optical signal may become larger with increasing separation compared with a distance to a lens section on a ferrule on another side. This causes good optical property during coupling with a connector and can reduce damage to eyes by light during no coupling with the connector.

The ferrule end surface may include an elastic member surrounding the recess site. This closely seals the lens sections when the ferrules are mutually coupled, thereby ensuring preventing a water droplet from attaching to the lens sections even if humidity changes.

The light transmitting part may include a reflective section that reflects the optical signal to transform an optical path.

The following method of manufacturing an optical-fiber-attached ferrule becomes apparent. The method includes (1) preparing, (2) inserting, (3) abutting, and (4) filling. (1) The preparing prepares a ferrule that includes a ferrule end surface, fiber holes into which each of optical fibers are inserted, an adhesive-filling section, a light transmitting part, and a sheet-shaped solid refractive index-matching material. The adhesive-filling section has an opening from which an adhesive is to be filled. The adhesive-filling section internally includes an opening surface of the optical fiber hole and an opposed surface opposed to the opening surface. The light transmitting part transmits an optical signal between the ferrule end surface and the opposed surface. The sheet-shaped solid refractive index-matching material is disposed on the opposed surface of the adhesive-filling section. The sheet-shaped solid refractive index-matching material deforms a surface when the end surfaces of the optical fibers are caused to abut onto. (2) The inserting inserts the optical fibers into the optical fiber holes. (3) The abutting causes the end surfaces of the optical fibers protruding from the opening surface to abut onto the solid refractive index-matching material. (4) The filling fills the adhesive in the adhesive-filling section.

<Outline>

Figure 1B:
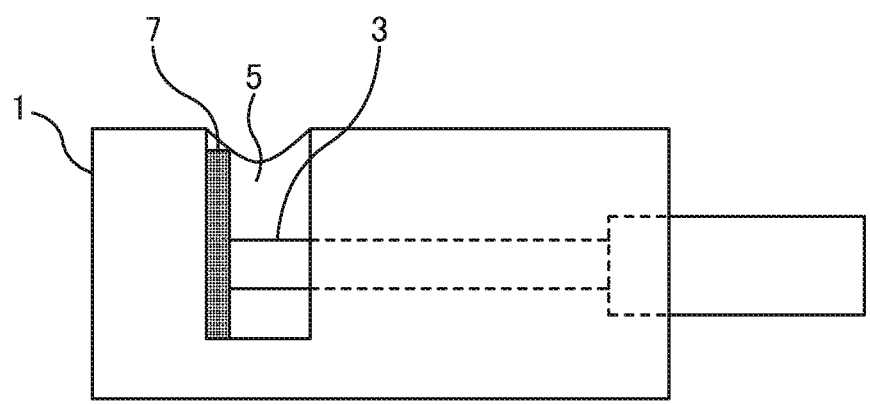
Figure 1C:
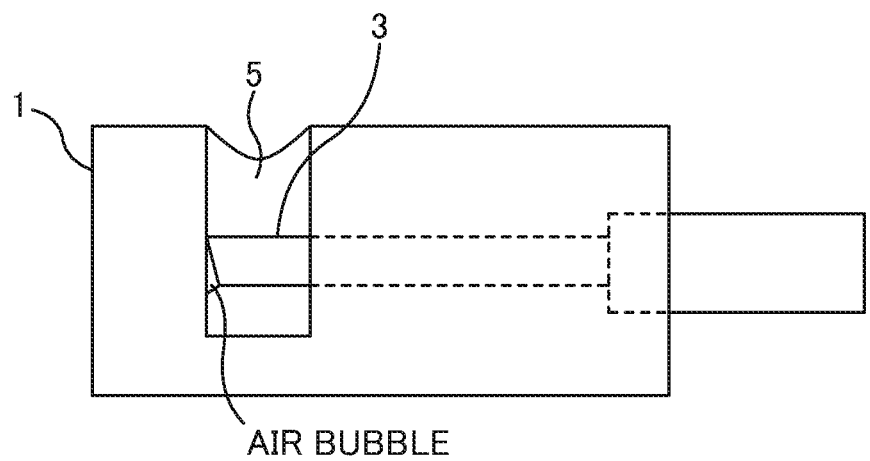
Figure 10:
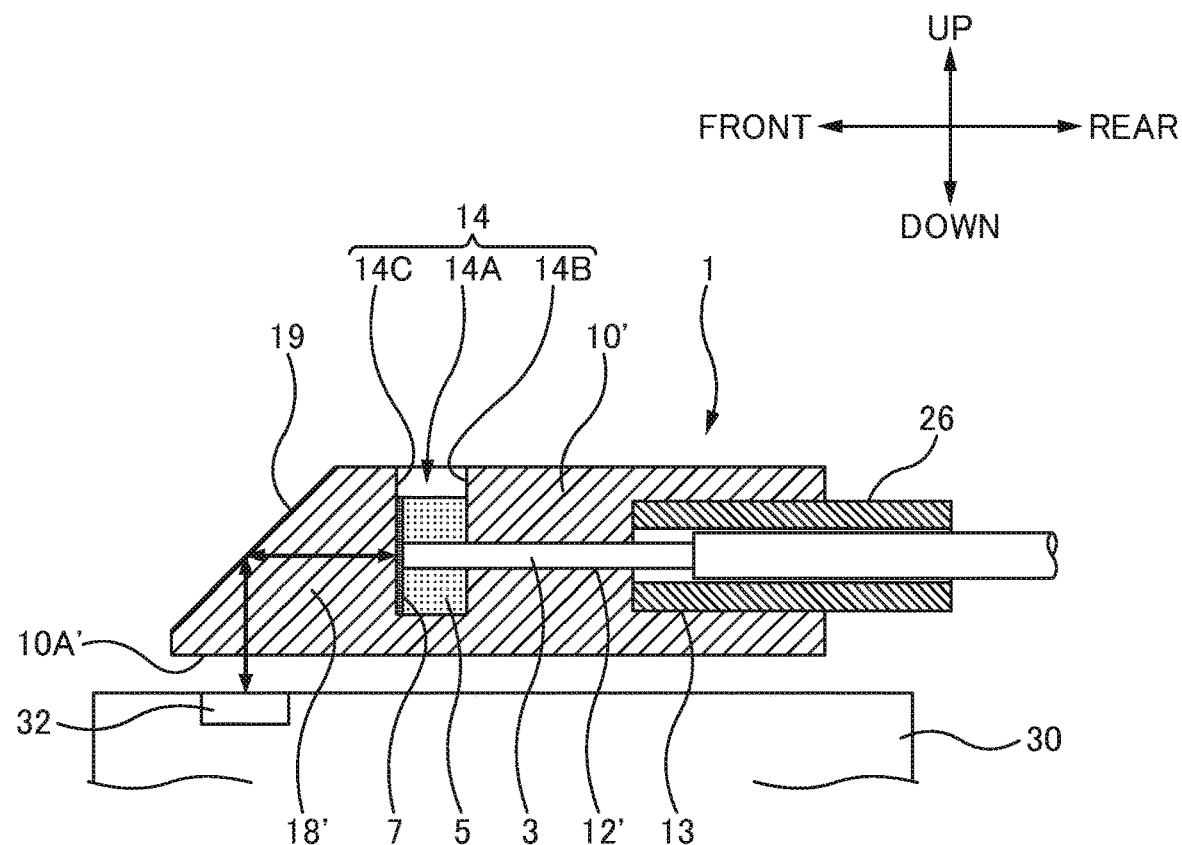
FIG. 10 is a schematic cross-sectional view of a ferrule 1' of one or more embodiments.

FIG. 1A to FIG. 1C are explanatory diagrams of an outline of a ferrule of one or more embodiments. FIG. 1A and FIG. 1B are drawings illustrating one or more embodiments, and FIG. 10 is a drawing illustrating a comparative example. In these drawings, a ferrule 1 has an adhesive-filling section 14 (a hollow) to be filled with an adhesive 5. The adhesive 5 is filled in the adhesive-filling section 14 with distal ends of optical fibers 3 disposed in the adhesive-filling section 14 to fix the optical fibers 3.

In the comparative example (FIG. 10), a cut state at end surfaces (distal ends) of the optical fibers 3 becomes oblique. A gap is generated between an inner wall of the adhesive-filling section 14 of the ferrule 1 and the end surfaces of the optical fibers 3. Such gap generates an air layer (an air bubble) at the gap part during the filling of the adhesive 5, possibly causing the signal loss of the optical signal. The ferrule 1 (a resin) and the optical fiber 3 have a difference in a coefficient of linear expansion. The ferrule 1 significantly varies at the temperature change (at a high temperature) while the optical fiber 3 varies slightly. In view of this, the optical fiber 3 possibly peels off from the inner wall of the adhesive-filling section 14 at the temperature change (at the high temperature).

With one or more embodiments (FIG. 1A and FIG. 1B), a sheet-shaped solid refractive index-matching material 7 is disposed on the inner wall of the adhesive-filling section 14. The end surfaces of the optical fibers 3 are caused to abut onto the sheet-shaped solid refractive index-matching material 7. This configuration deforms the surface of the sheet-shaped solid refractive index-matching material 7 according to the end surfaces of the optical fibers 3, ensuring reducing the gap and ensuring filling the adhesive 5 in a gapless state. This ensures reducing the air bubbles and ensures reducing the signal loss of the optical signal. The sheet-shaped solid refractive index-matching material 7 has viscosity; therefore, the optical fiber 3 is less likely to peel off at the temperature change (at the high temperature). Accordingly, the signal loss of the optical signal can be reduced at the temperature change.

At the fiber cut, a variation around 20 to 30 μm possibly occurs in the length. Accordingly, when the plurality of optical fibers 3 are caused to abut onto, the variation in length further increases the possibility of generating the gap. However, in one or more embodiments, as illustrated in FIG. 1A, the plurality of optical fibers 3 are caused to abut onto the identical solid refractive index-matching material 7. Thus, in the case where the plurality of optical fibers 3 are caused to abut onto the solid refractive index-matching material 7, the sheet-shaped solid refractive index-matching material 7 deforms according to the respective end surfaces of the optical fibers 3. Accordingly, since the solid refractive index-matching material 7 absorbs the variation in length of the optical fibers 3, the variation in length of the optical fibers 3 is accepted.

Thus, in one or more embodiments, the sheet-shaped solid refractive index-matching material 7 is disposed on the inner wall of the adhesive-filling section 14, and the end surfaces of the optical fibers 3 are caused to abut onto this solid refractive index-matching material 7. This allows preventing the gap and the peeling. In view of this, the signal loss of the optical signal can be reduced.

<Configuration>

Figure 2:
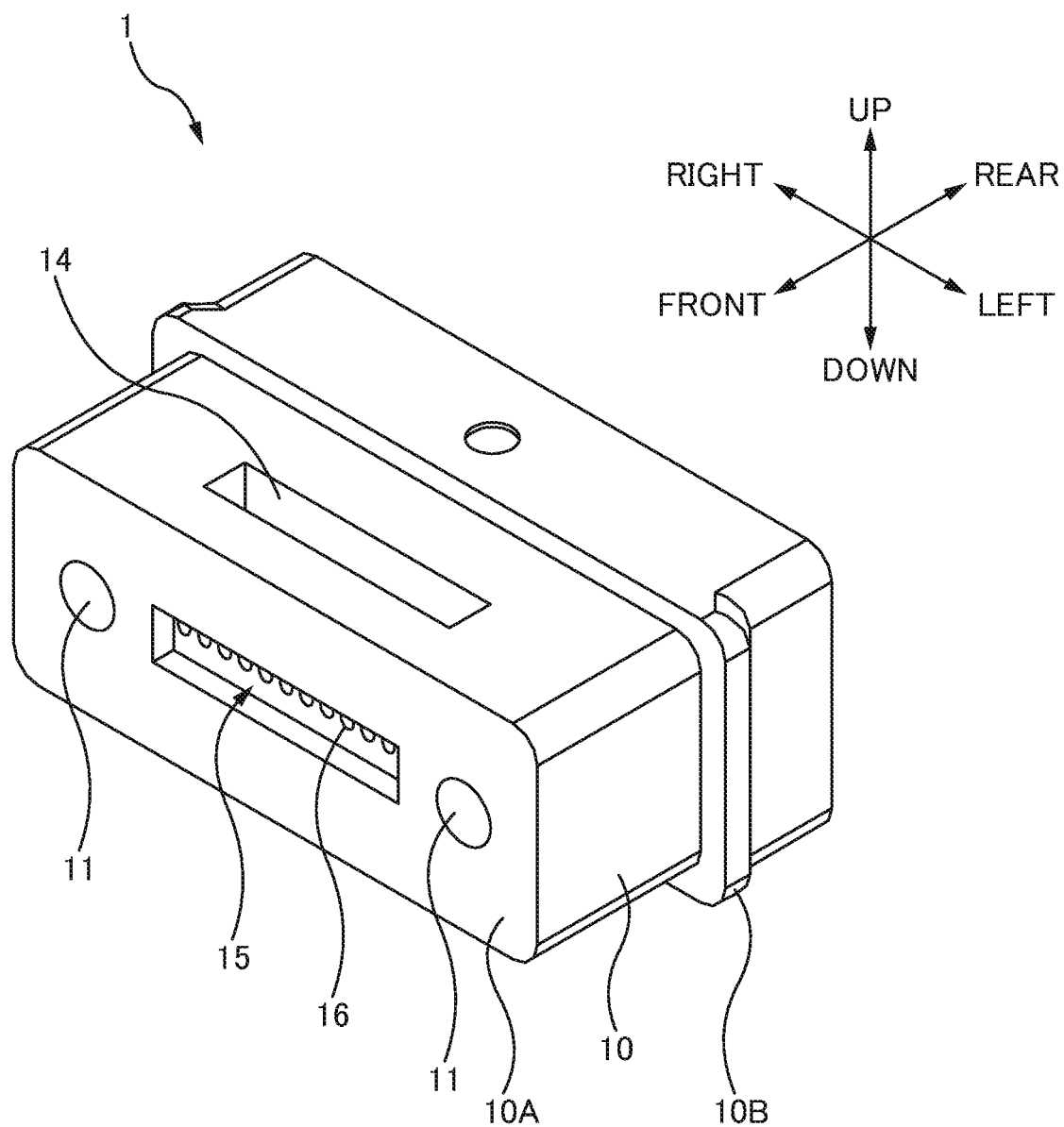
FIG. 2 is an overall perspective view of a ferrule 1 of one or more embodiments.
Figure 3A:
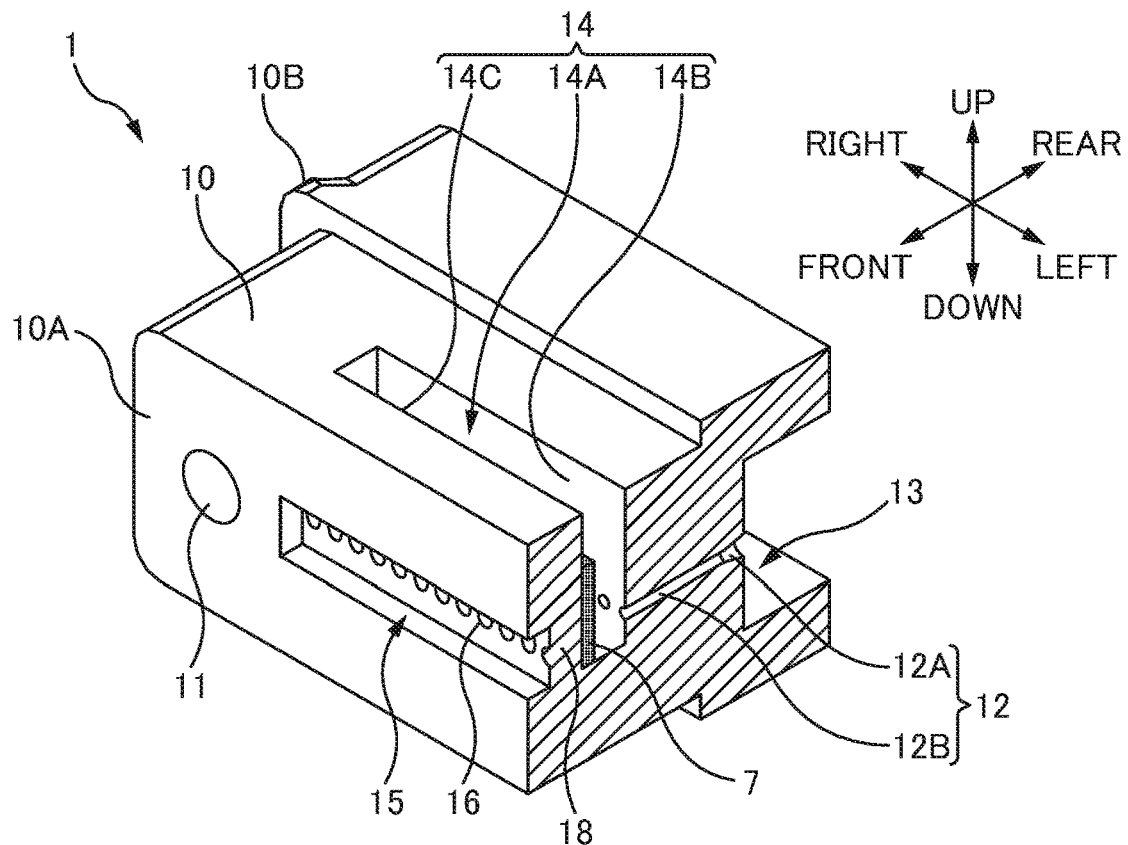
FIG. 3A and FIG. 3B are cutaway perspective views of the ferrule 1 of one or more embodiments.
Figure 3B:
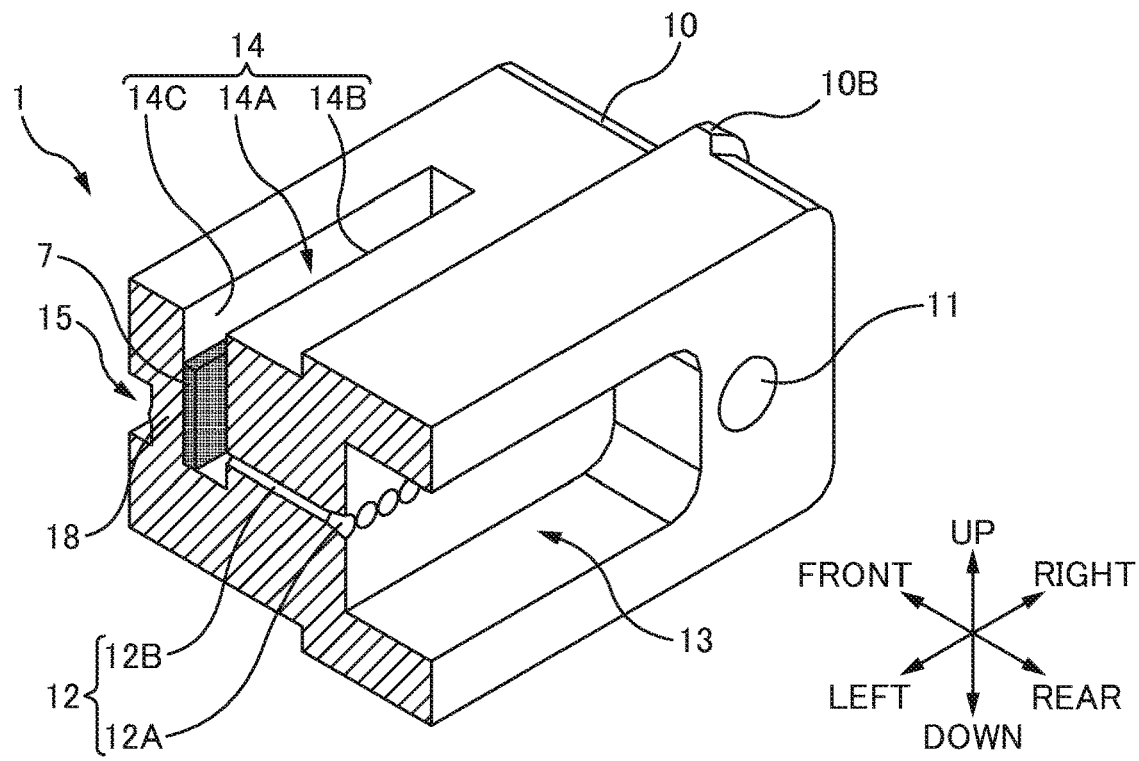
Figure 4:
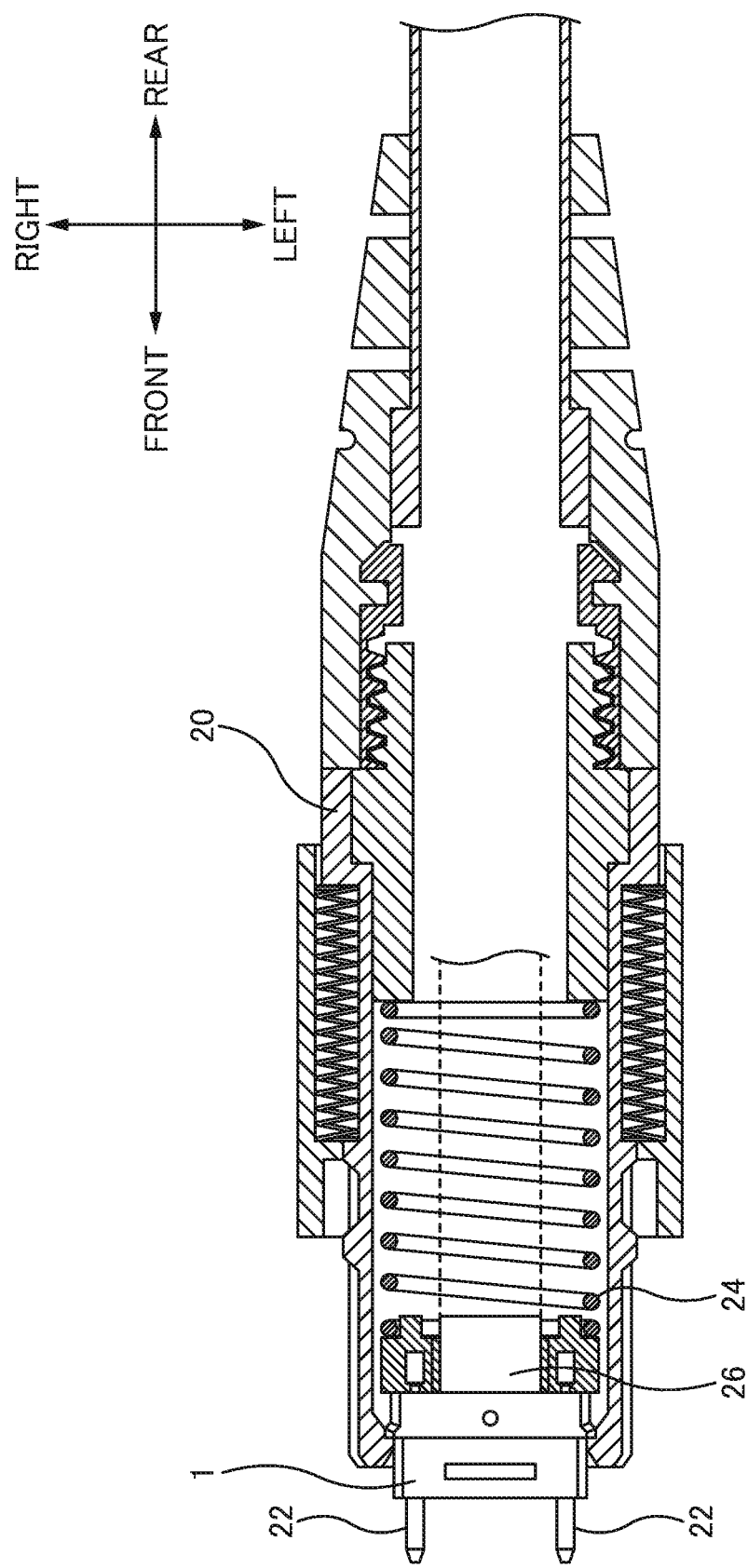
FIG. 4 is a schematic cross-sectional view of an optical connector with the ferrule 1 of one or more embodiments mounted.

FIG. 2 is an overall perspective view of the ferrule 1 of one or more embodiments. FIG. 3A and FIG. 3B are cutaway perspective views of the ferrule 1 of one or more embodiments. FIG. 4 is a schematic cross-sectional view of an optical connector with the ferrule 1 of one or more embodiments mounted.

The following description defines respective directions as illustrated in the drawings. That is, the direction of an optical fiber hole 12 is defined as a "front-rear direction". That is, an optical axis direction of the optical fiber 3 to be inserted into the optical fiber hole 12 is defined as the "front-rear direction." In this front-rear direction, a ferrule end surface 10A side is defined as the "front" and the other side as the "rear." That is, the side of the optical fiber end surfaces is defined as the "front."

The thickness direction of the ferrule 1 is defined as an "up-down direction" and a side of an upper opening 14A on the adhesive-filling section 14 is defined as "up" and the other side as "down."

A width direction of the ferrule 1 is defined as a "right-left direction." A direction perpendicular to the front-rear direction and the up-down direction is defined as the "right-left direction." A direction that two guide pin holes 11 are arranged is defined as the "right-left direction." A direction that the optical fiber holes 12 are arranged is defined as the "right-left direction." A direction that the plurality of optical fibers 3 constituting optical fiber ribbons are arranged is defined as the "right-left direction."

First, the following describes differences between the ferrule 1 of one or more embodiments and an ordinary MT ferrule.

In the ordinary MT ferrule (JIS C5981), optical fiber end surfaces are exposed from an end surface of the ferrule. The end surfaces of the ferrules are caused to abut onto one another to physically couple the optical fiber end surfaces.

In contrast to this, the optical fiber end surfaces are not exposed from the ferrule end surface 10A of the ferrule 1 of one or more embodiments. With the ferrule 1 of one or more embodiments, lens sections 16 are disposed at a recess site 15 of the ferrule end surface 10A, and the optical signal enters from/is emitted from the lens sections 16. That is, the ferrule 1 of one or more embodiments has no physical coupling between the optical fiber end surfaces. This feature enables high durability not causing deterioration even when the attachment and removal are repeatedly performed.

The ferrule 1 is a member to hold the end portions of the optical fibers 3 to transmit the optical signals. The end surface on the front side of a body portion 10 of the ferrule 1 (the ferrule end surface 10A) is a coupling end surface coupled to an optical connector on the other side. A flange part 10B, which protrudes outside from the outer peripheral surface of the body portion 10, is formed on the rear side of the body portion 10. The body portion 10 including the ferrule end surface 10A and the flange part 10B is integrally molded with a resin (for example, a transparent resin) that transmits the optical signal. The end portions of the plurality of optical fibers 3 are held at the inside of this body portion 10. The dimension of the ferrule 1 of one or more embodiments in the front-rear direction is 3.5 mm to 5 mm, which is shorter than the ordinary MT ferrule (about 8 mm).

The body portion 10 includes the guide pin holes 11, the optical fiber holes 12, a boot hole 13, the adhesive-filling section 14, the recess site 15, the lens sections 16, and a light transmitting part 18. The solid refractive index-matching material 7 is disposed on the adhesive-filling section 14 of the body portion 10.

The guide pin hole 11 is a hole through which a guide pin 22 (see FIG. 4) is inserted. Inserting the guide pins 22 into the guide pin holes 11 positions the mutual optical connectors. The guide pin holes 11 penetrate the body portion 10 in the front-rear direction. On the ferrule end surface 10A, the two guide pin holes 11 are open. The two guide pin holes 11 are formed spaced in the right-left direction so as to sandwich the recess site 15 laterally.

The optical fiber holes 12 are holes through which the optical fibers 3 are inserted. The optical fiber hole 12 is a hole to position the optical fiber 3. The optical fiber holes 12 penetrate between the boot hole 13 and the adhesive-filling section 14. A bare fiber formed by removing a coating from an optical fiber is inserted into the optical fiber hole 12. The plurality of optical fiber holes 12 are arranged in the right-left direction, each of which is parallel in the front-rear direction. That is, the plurality of optical fiber holes 12 parallel to one another are arranged in the right-left direction. The optical fiber holes 12 each include a tapered part 12A and a fiber fixing part 12B.

The tapered part 12A is disposed at the rear end part of the optical fiber hole 12 and has a tapered shape expanding to the rear side. Disposing such tapered part 12A facilities inserting the optical fiber 3 into the optical fiber hole 12.

The fiber fixing part 12B is disposed on the front side with respect to the tapered part 12A and has a size (a diameter) approximately identical to the diameter of the optical fiber 3. This ensures fixing (positioning) the optical fiber inserted into the optical fiber hole 12. In one or more embodiments, to accurately fix the optical fiber 3, the dimension of the fiber fixing part 12B in the front-rear direction is set to about 1.2 mm.

The boot hole 13 is disposed on the end surface on the rear side of the ferrule 1. The boot hole 13 is a hole to house and fix a boot 26 (see FIG. 4) mounted to the optical fibers 3.

The adhesive-filling section 14 is a hollow portion having the upper opening 14A (equivalent to an opening) from which the adhesive 5 is filled. The adhesive-filling section 14 has an optical fiber hole opening surface 14B (equivalent to an opening surface) and an abutting surface 14C (equivalent to an opposed surface).

The upper opening 14A is formed to have a rectangular shape elongated in the right-left direction on the top surface of the body portion 10 of the ferrule 1. That is, the adhesive-filling section 14 forms the hollow that is long in the right-left direction (longer than a length that the plurality of optical fiber holes 12 and lens sections 16 are arranged in the right-left direction). The bottom of the hollow is positioned lower than the optical fiber holes 12 and the lens sections 16. The adhesive 5 is filled from this upper opening 14A into the hollow (the adhesive-filling section 14). One or more embodiments configure the width of the upper opening 14A in the front-rear direction to 0.35 mm to 0.50 mm. Supposing that the width of the upper opening 14A is narrower than 0.35 mm, the filling of the adhesive becomes difficult. Supposing that the width of the upper opening 14A is wider than 0.50 mm, securing the length of the fiber fixing part 12B under a situation where the dimension of the ferrule 1 in the front-rear direction is short becomes difficult.

The optical fiber hole opening surface 14B is the inner wall on the rear side of the adhesive-filling section 14. On this optical fiber hole opening surface 14B, the plurality of optical fiber holes 12 are open and arranged in the right-left direction.

The abutting surface 14C (equivalent to the opposed surface) is the inner wall on the front side of the adhesive-filling section 14 and is opposed to the optical fiber hole opening surface 14B. The abutting surface 14C is a surface on the side onto which the end surfaces of the optical fibers 3 are caused to abut. The solid refractive index-matching material 7 is disposed on the abutting surface 14C.

The recess site 15 is a site recessed to the ferrule end surface 10A. The recess site 15 is disposed between the two guide pin holes 11 on the ferrule end surface 10A. The recess site 15 is formed into a rectangular shape elongated in the right-left direction so as to correspond to the plurality of optical fiber holes 12.

The lens sections 16 are disposed on the bottom surface (the surface on the rear side) of the recess site 15. The lens sections 16 are disposed corresponding to the plurality of respective optical fibers 3 (in other words, the plurality of optical fiber holes 12). The optical signal is input to and output from the optical fibers 3 via the lens sections 16.

The light transmitting part 18 is a site (a site forming an optical path) that transmits the optical signals between the ferrule end surface 10A (more specifically, the lens sections 16 at the recess site 15 of the ferrule end surface 10A) and the abutting surface 14C of the adhesive-filling section 14. The body portion 10 of one or more embodiments may be integrally molded with the resin that transmits the optical signals. Meanwhile, it is only necessary that at least the site where the optical path is formed can transmit the optical signals, and a site other than this site may be made of another material (a material not transmitting the optical signals).

The solid refractive index-matching material 7 is an optically-transparent sheet-shaped member. The refractive index of the solid refractive index-matching material 7 is equal to or greater than a refractive index of a core of the optical fiber 3 and equal to or smaller than the refractive index of a constituent resin of the ferrule 1 (the body portion 10), for example, 1.4 to 1.7. The solid refractive index-matching material 7 is disposed on the abutting surface 14C, which is the inner wall on the front side of the adhesive-filling section 14. The solid refractive index-matching material 7 has hardness to the extent of deforming the surface when the end surfaces of the optical fibers 3 are caused to abut thereon. This ensures reducing the formation of the air layer (see FIG. 10) on the end surface of the optical fiber 3. A relationship between the hardness and the thickness for the solid refractive index-matching material 7 will be described later.

In one or more embodiments, since the plurality of optical fibers 3 are arranged in the right-left direction, shaping the solid refractive index-matching material 7 into the sheet shape long in the right-left direction makes it possible to cause the plurality of optical fibers 3 to abut onto the identical solid refractive index-matching material 7. This facilitates the manufacture compared with the case where the solid refractive index-matching materials 7 are arranged for each of the optical fibers 3.

As a material of the solid refractive index-matching material 7, for example, acrylic-based, epoxy-based, vinyl-based, silicone-based, rubber-based, urethane-based, meth-acryl-based, nylon-based, bisphenol-based, diol-based, polyimide-based, fluorinated epoxy-based, and fluorinated acrylic-based high-polymer materials can be used.

Both surfaces of the solid refractive index-matching material 7 have viscosity. In view of this, the solid refractive index-matching material 7 is less likely to peel off from the optical fibers 3 and also is less likely to peel off from the abutting surface 14C of the adhesive-filling section 14. Accordingly, the signal loss of the optical signal can be reduced, for example, at the temperature change. As such solid refractive index-matching material 7, the solid refractive index-matching material 7 formed by shaping an adhesive material made of the high-polymer material into a film can be used. Among them, in terms of environment resistance and adhesiveness, the silicone-based and the acrylic-based high-polymer materials may be applicable in general.

As illustrated in FIG. 4, the ferrule 1 of one or more embodiments can be housed in a housing 20 of an optical connector device for use.

The housing 20 is a member that houses the ferrule 1 to be retreatable. A protruding part is formed at an internal space of the housing 20. With this protruding part engaged with the flange part 10B of the ferrule 1, the ferrule 1 is biased to the front side by a repulsion force from a spring 24.

The guide pins 22 are inserted into the two guide pin holes 11 of the ferrule 1. These guide pins 22 position the ferrule 1 with respect to the ferrule on the other side.

The boot 26 is inserted into the boot hole 13 on the ferrule 1. A cross-sectional surface of the boot 26 has an approximately tubular rectangular shape. The plurality of respective optical fibers 3 penetrate the boot 26 in the front-rear direction. Although the boot 26 may be configured of a flexible material such as a rubber and an elastomer, the boot 26 may be configured of a low-flexible material such as a resin and a metal. The dimensions of the boot 26 in the right-left direction and the up-down direction are approximately identical to the dimensions of the boot hole 13. The boot 26 is fitted to the boot hole 13. The use of such boot 26 ensures reducing a bending and damage of the optical fiber 3.

Figure 5:
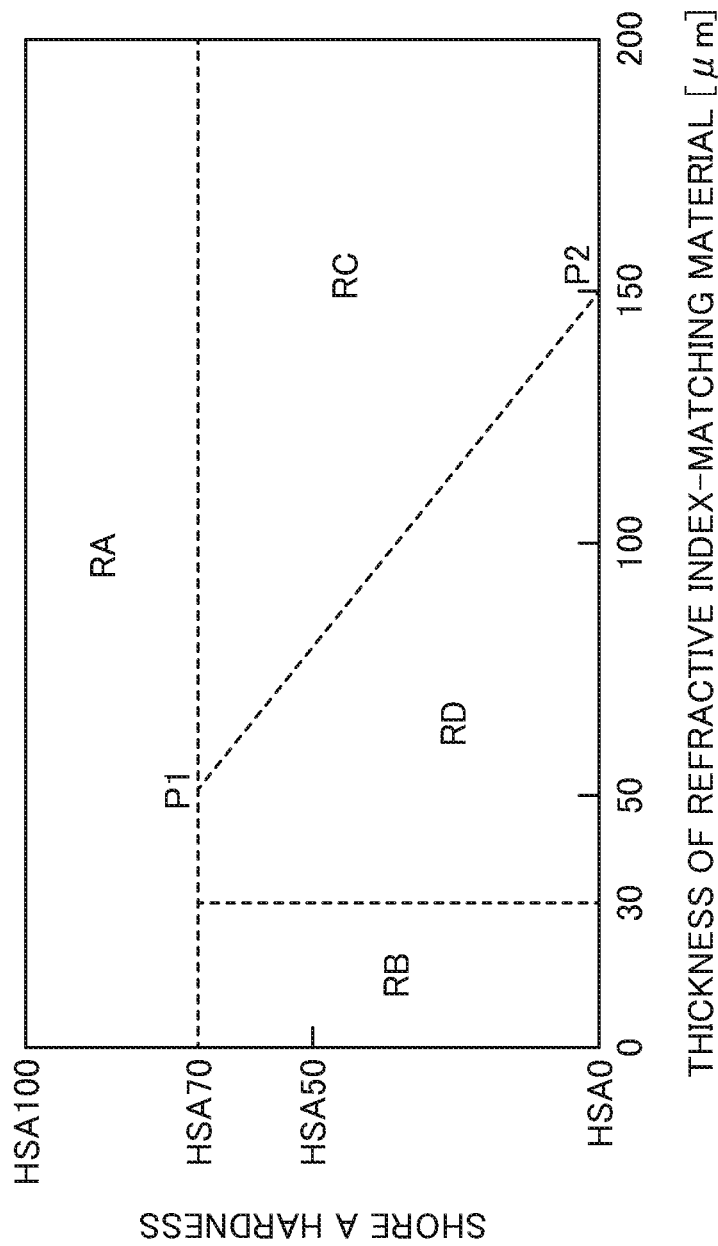
FIG. 5 is an explanatory diagram of a relationship between a hardness and a thickness of a sheet of a solid refractive index-matching material 7.

FIG. 5 is an explanatory diagram of the relationship between the hardness and the thickness of the sheet of the solid refractive index-matching material 7. The horizontal axis indicates the thickness of the solid refractive index-matching material 7 and the vertical axis indicates Shore A hardness (HSA). As the solid refractive index-matching material 7, the solid refractive index-matching material 7 in a region RD illustrated in FIG. 5 may be used. In the drawing, a region RC and the region RD are sectioned by a straight line connecting a point P1 (HSA70 and the thickness of 50 μm) and a point P2 (HSA0 and the thickness of 150 μm).

In a region RA (the region with the Shore A hardness larger than 70) exhibits excessively high hardness and low followability to the temperature change. This makes the followability to the optical fiber end surface insufficient and therefore the gap is likely to occur. Note that, even the use of the solid refractive index-matching material 7 in the region RA can reduce the gaps on the front side of the optical fiber end surfaces compared with the case where the solid refractive index-matching material 7 is absent.

In a region RB (a region with the Shore A hardness of equal to or less than 70 and the thickness smaller than 30 μm), since the thickness is too thin, an impact force reduction effect against the abutment of the optical fiber end surfaces cannot be fully provided. In view of this, the gap possibly occurs between the solid refractive index-matching material 7 and the optical fiber end surfaces due to, for example, the cut state and the roughness of the optical fiber end surfaces. Note that, even the use of the solid refractive index-matching material 7 in the region RB can reduce the gaps on the front side of the optical fiber end surfaces compared with the case where the solid refractive index-matching material 7 is absent.

In the region RC (the region having the Shore A hardness of equal to or less than 70 and the thickness larger than the thicknesses at the straight line connecting the point P1 and the point P2), a distance between the optical fiber end surfaces and the abutting surface 14C of the adhesive-filling section 14 becomes too large, which is inappropriate. Note that, even in the case where the solid refractive index-matching material 7 in the region RC is used, the gaps on the front side of the optical fiber end surfaces can be reduced compared with the case where the solid refractive index-matching material 7 is absent.

Accordingly, the region RD (among the region having the Shore A hardness of equal to or less than 70 and the thickness of 30 μm or more, the region on the side, where the thickness is smaller than the thicknesses at the straight line connecting the point P1 and the point P2, and including this straight line) is an appropriate range. That is, as the solid refractive index-matching material 7, the solid refractive index-matching material 7 in the range surrounded by the four points (HSA0, the thickness 30 μm), (HSA70, the thickness 30 μm), (HSA70, the thickness 50 μm), and (HSA0, the thickness 150 μm) in FIG. 5 may be used.

<Assembly Procedure>

Figure 6:
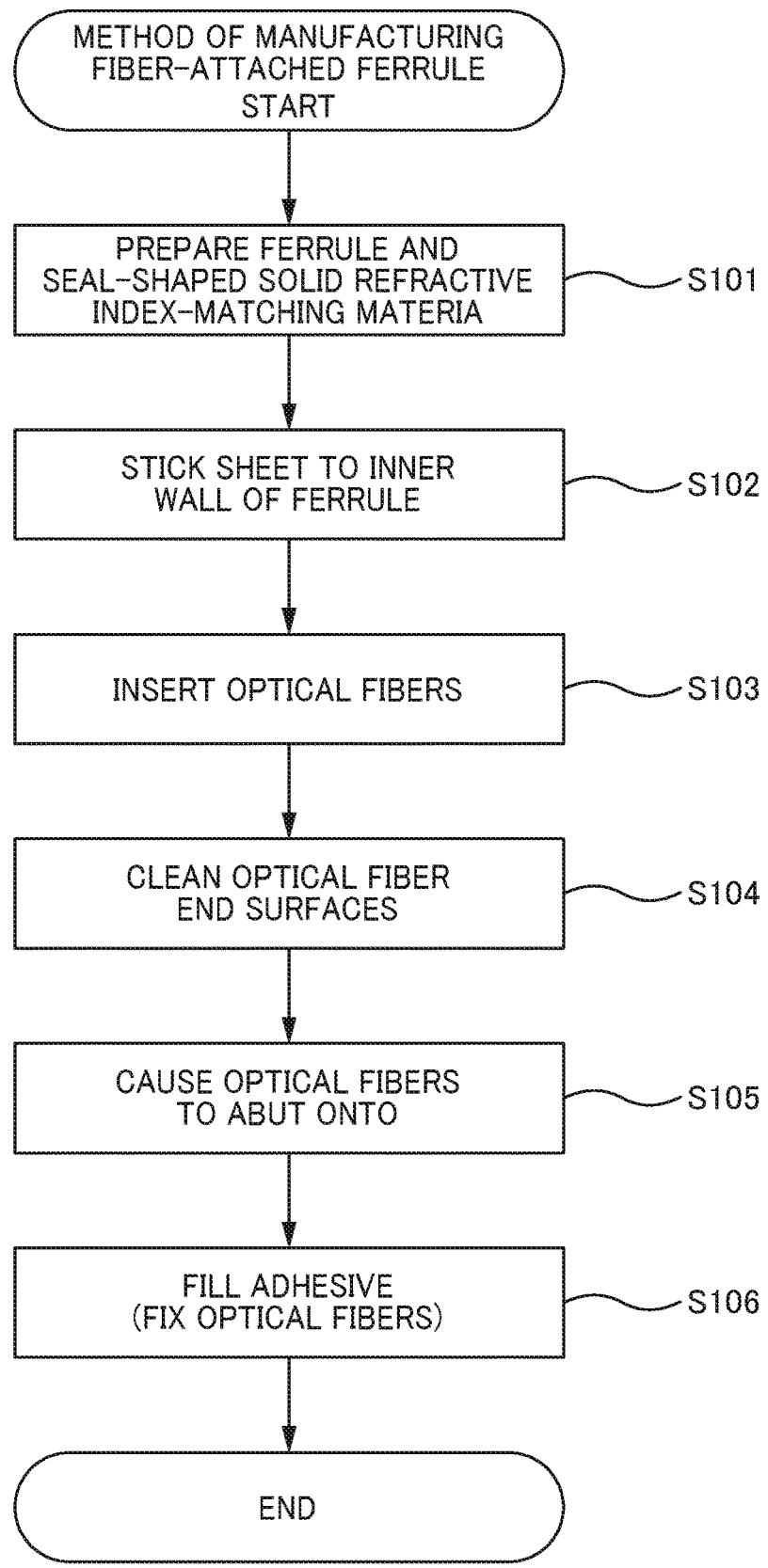
FIG. 6 is a flowchart illustrating an assembly procedure (a manufacturing method) of one or more embodiments of an optical-fiber-attached ferrule.

FIG. 6 is a flowchart illustrating an assembly procedure (a manufacturing method) of the optical-fiber-attached ferrule.

First, the ferrule 1 (here, the body portion 10) and the sheet-shaped solid refractive index-matching material 7 are prepared (S101). Since both surfaces of the sheet-shaped solid refractive index-matching material 7 have viscosity, protection sheets are stuck to both surfaces of the solid refractive index-matching material 7.

Using tweezers or a similar tool, this sheet-shaped solid refractive index-matching material 7 is stuck to the inner wall (the abutting surface 14C) of the adhesive-filling section 14 of the ferrule 1 (the body portion 10) (S102). At this time, downside (the lower side) of the solid refractive index-matching material 7 is caused to abut onto the bottom surface of the adhesive-filling section 14 and the solid refractive index-matching material 7 is stuck gradually from the lower side so as not to include the air bubble. After the solid refractive index-matching material 7 is stuck, whether the air bubble has been included or not is confirmed from the ferrule end surface 10A side. When the air bubble is not included here, because of the viscosity of the solid refractive index-matching material 7, the air bubble is not included even after that. Thus, the ferrule 1 illustrated in FIG. 2, FIG. 3A, and FIG. 3B is prepared.

Next, the respective optical fibers 3 of the optical fiber ribbon are inserted into the optical fiber holes 12 of the ferrule 1 (S103). Note that, here, the optical fiber end surfaces have not been caused to abut onto the sheet-shaped solid refractive index-matching material 7 yet.

After that, air cleaning is performed on the inside of the adhesive-filling section 14 to clean the optical fiber end surfaces (S104). Thus, dust and the like attached to the optical fiber end surface when the optical fiber 3 is passed through the optical fiber hole 12 is removed.

After the air cleaning, the remaining protection sheets on the solid refractive index-matching material 7 are stripped, and the optical fiber end surfaces protruding from the optical fiber hole opening surface 14B are caused to abut onto the solid refractive index-matching material 7 (S105). In one or more embodiments, since the solid refractive index-matching material 7 is formed into the long sheet shape in the right-left direction, the plurality of optical fibers 3 can be caused to abut onto the identical the solid refractive index-matching material 7. Even if the plurality of optical fibers 3 vary in the length, the gap is not generated between the solid refractive index-matching material 7 and the optical fiber end surfaces. The viscosity of the solid refractive index-matching material 7 is less likely to generate the gap after the abutment until the filling of the adhesive.

Afterwards, the adhesive 5 is filled from the upper opening 14A into the adhesive-filling section 14 to fix the optical fibers 3 (S106).

<Transmission Path for Optical Signal>

As described above, the ferrule 1 of one or more embodiments may not have the physical coupling between the mutual optical fiber end surfaces and transmits the optical signals via the lens sections 16 at the recess site 15. The following describes the transmission path (the optical path) for the optical signals in one or more embodiments.

Figure 7:
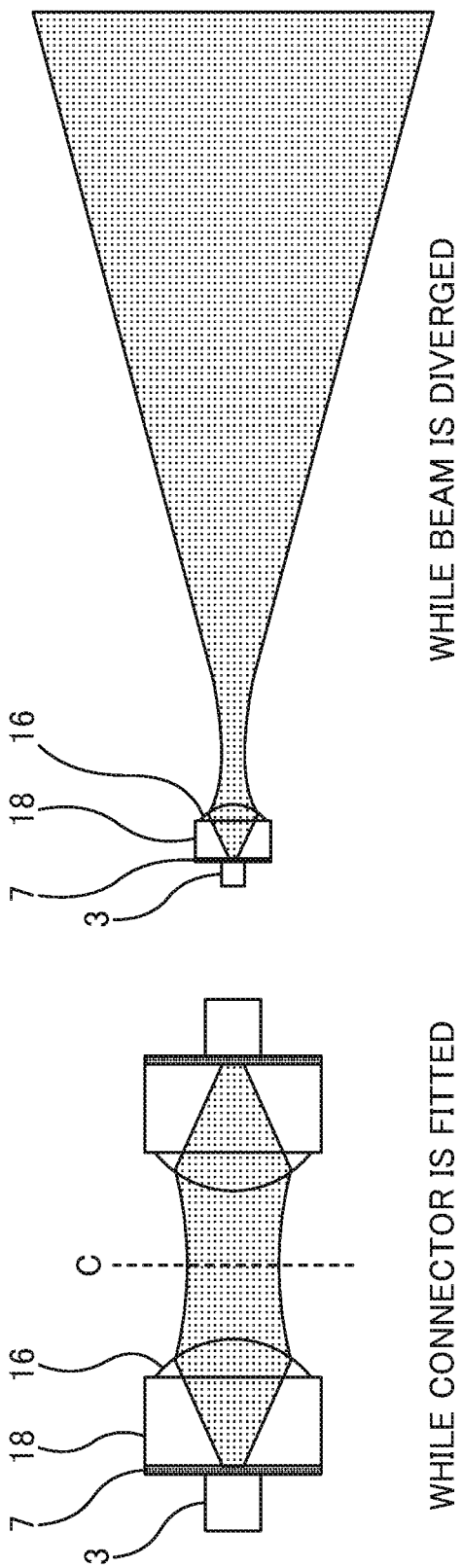
FIG. 7A and FIG. 7B are explanatory diagrams of a transmission path for an optical signal.

FIG. 7A and FIG. 7B are explanatory diagrams of the transmission path for the optical signal.

During the coupling of the connector, the optical signal has a property close to collimated light (parallel light). Note that, as illustrated in FIG. 7A, the optical signal is not completely parallel but the diameter of the optical signal up to the lens section of the ferrule on the other side is reduced to be thinner than the diameter of the optical signal at the lens section 16 (a beam waist). In more detail, the diameter of the optical signal becomes the thinnest in midcourse to the lens section on the other side. The position where this diameter of the optical signal becomes the thinnest is denoted by C. In this example, the diameter of the optical signal gradually expands from the position C and becomes almost identical to the diameter of the lens section 16 of the lens section of the ferrule on the other side. In the example of FIG. 7A, the position C is equivalent to the position of the ferrule end surface 10A, and from the lens sections 16 to the position C is equivalent to the inside of the recess site 15. Note that, the position C needs not to be equivalent to the position of the ferrule end surface 10A, and the position C, for example, may be displaced from the position of the ferrule end surface 10A. Thus, the diameter of the optical signal at the recess site 15 is reduced to be thinner than the diameter of the optical signal at the lens section 16. In one or more embodiments, a ratio of the diameter of the optical signal at the lens section 16 to the diameter of the optical signal at the position C is about 1.2 to 4.0 (a wavelength of the optical signal: 850 nm).

While the connector is not coupled, as illustrated in FIG. 7B, the optical signal expands and is diverged. That is, as the distance becomes larger than the distance in FIG. 7A (the distance to the lens section of the ferrule on the other side), the diameter of the optical signal becomes larger. While the collimated light possibly harms eyes through straight gaze, one or more embodiments diverge the light while the connector is not coupled as illustrated in FIG. 7B, thereby ensuring reducing damage to the eyes by the light (eye safety).

Thus, during the connector coupling, the light is close to the collimated light and therefore exhibits a good optical property. During no connector coupling, the light is diverged to achieve the eye safety.

<Modifications>

Figure 8:
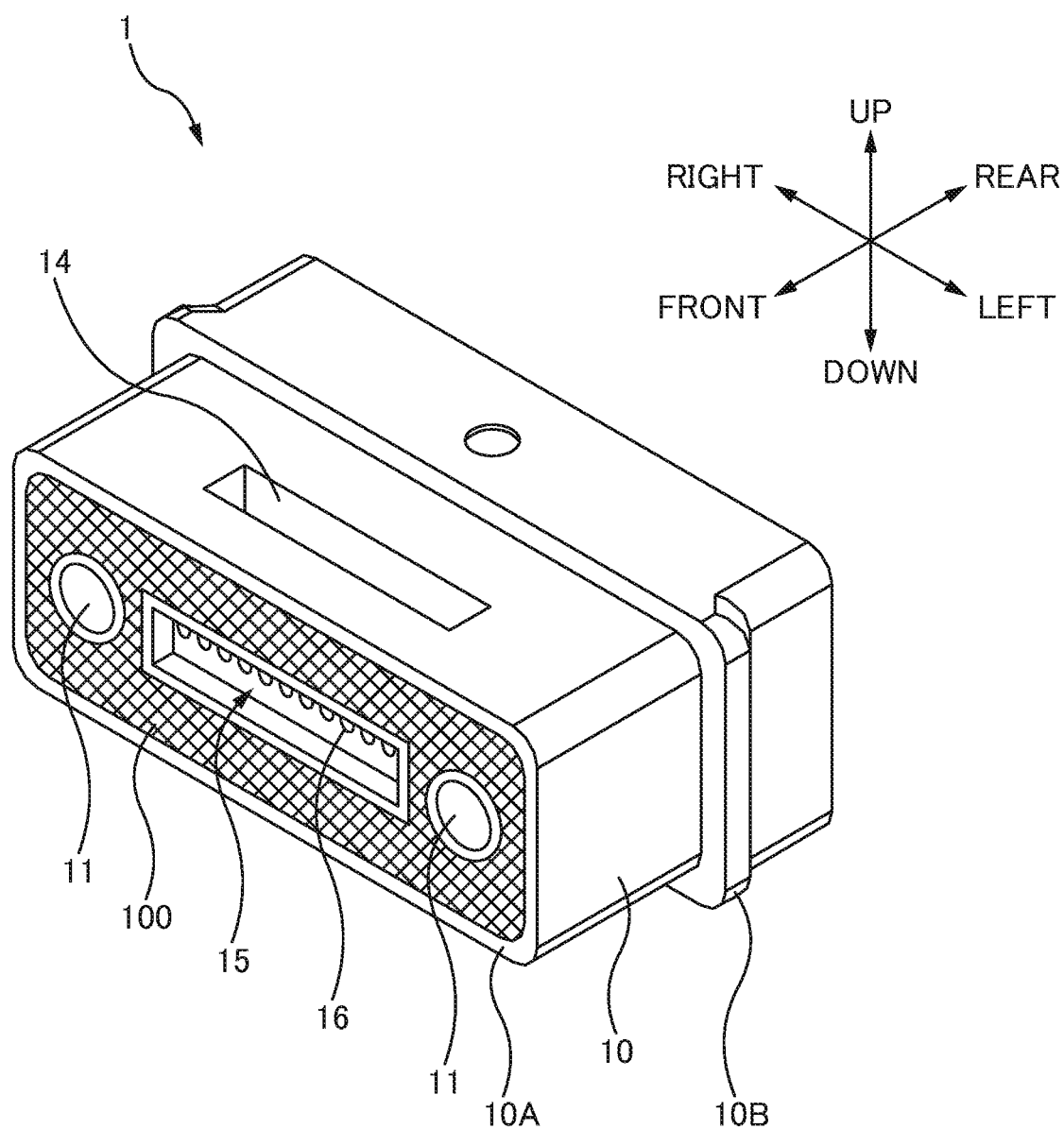
FIG. 8 is an explanatory diagram of a modification of the ferrule 1 of one or more embodiments.

FIG. 8 is an explanatory diagram of the modification of the ferrule 1 of one or more embodiments.

With this modification, an elastic body 100 is disposed on the ferrule end surface 10A of the ferrule 1.

As illustrated in the drawing, the elastic body 100 is disposed on the ferrule end surface 10A so as to surround the recess site 15 and the two guide pin holes 11. Thus, the elastic body 100 is disposed on the ferrule end surface 10A so as to interpose the elastic body 100 between the ferrules when the ferrules are mutually coupled, thus closely sealing the lens sections 16. Accordingly, even when the humidity changes a water droplet is not allowed to be attached to the lens sections 16.

Figure 9A:
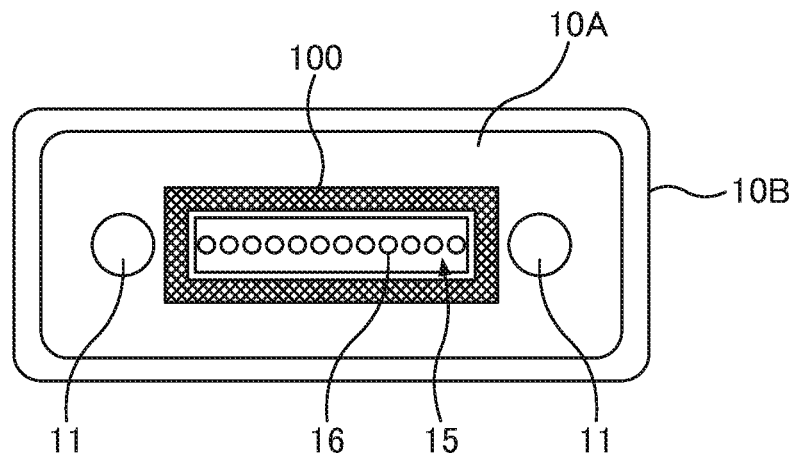
FIG. 9A to FIG. 9C are drawings illustrating other examples of an arrangement of an elastic body 100.
Figure 9B:
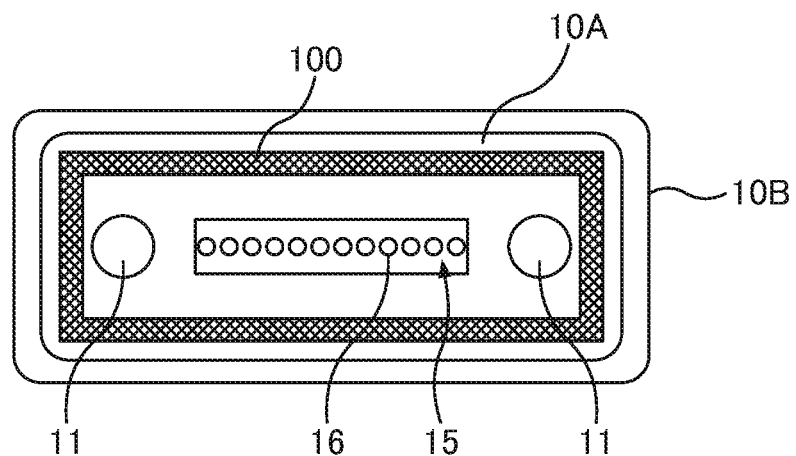
Figure 9C:
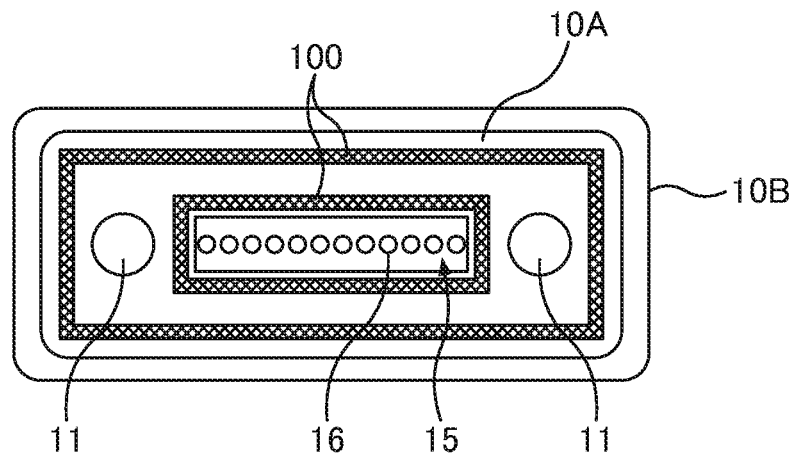

FIG. 9A to FIG. 9C are drawings illustrating other examples of an arrangement of the elastic body 100.

It is only necessary that the elastic body 100 surrounds at least the recess site 15 (the lens sections 16). Accordingly, as illustrated in FIG. 9A, only the recess site 15 may be surrounded or as illustrated in FIG. 9B, the outside of the two guide pin holes 11 and the recess site 15 may be surrounded. Alternatively, as illustrated in FIG. 9C, the peripheral area of the recess site 15 and the outside with respect to the two guide pin holes 11 may be separately surrounded.

As described above, the ferrule 1 of one or more embodiments have the ferrule end surface 10A, the plurality of optical fiber holes 12, which are disposed for insertion of the respective optical fibers 3, and the adhesive-filling section 14 on which the upper opening 14A to fill the adhesive 5 is disposed. The adhesive-filling section 14 internally includes the optical fiber hole opening surface 14B and the abutting surface 14C opposed to the optical fiber hole opening surface 14S. Further, the ferrule 1 includes the light transmitting part 18, which transmits the optical signals between the ferrule end surface 10A and the abutting surface 14C, and the sheet-shaped solid refractive index-matching material 7, which is disposed on the abutting surface 14C of the adhesive-filling section 14, whose surface deforms with the abutment of the end surfaces of the optical fibers 3.

In one or more embodiments, the end surfaces of the optical fibers 3 are caused to abut onto the sheet-shaped solid refractive index-matching material 7, thereby ensuring gaps being made. This ensures avoiding the air bubbles from being generated at the filling of the adhesive 5, thereby ensuring reducing the signal loss of the optical signal. Since the sheet-shaped solid refractive index-matching material 7 has viscosity, the optical fiber 3 is less likely to peel off at the temperature change. Accordingly, the signal loss of the optical signal can be reduced even at the temperature change.

A ferrule of one or more embodiments may include a reflective section. The optical signal is transmitted via the reflective section.

FIG. 10 is a schematic cross-sectional view of the ferrule 1 of one or more embodiments. Like reference numerals designate corresponding or identical elements of one or more embodiments described above, and therefore description of such elements will be omitted here.

The ferrule 1 of one or more embodiments may be fixed on a photoelectric conversion module 30 that includes or incorporates a light element 32 by, for example, a holder (not illustrated). The light element 32 is a light-emitting element such as a semiconductor laser or a light receiving element such as a photodiode.

A body portion 10' of the ferrule 1 of one or more embodiments may be, similar to the body portion 10 described above, integrally molded with the resin, which transmits the optical signals. However, the body portion 10' does not include a flange part and a recess. In one or more embodiments, the lower surface of the body portion 10' is a ferrule end surface 10A'. In the body portion 10', the site on the front side with respect to the abutting surface 14C of the adhesive-filling section 14 is configured as a light transmitting part 18', and the light transmitting part 18' includes a reflective section 19. The reflective section 19 has an inclined surface approaching the adhesive-filling section 14 as heading from the lower surface (the ferrule end surface 10A') side to the top surface side.

When the light element 32 is the light-emitting element, the reflective section 19 reflects the light entering the ferrule end surface 10A' to the end surfaces of the optical fibers 3. With the light element 32 being the light receiving element, the light emitted from the end surfaces of the optical fibers 3 are reflected to the light element 32. Thus, the reflective section 19 reflects the light (the optical signal) to transform the optical path.

One or more other embodiments may include the sheet-shaped solid refractive index-matching material 7 on the abutting surface 14C of the adhesive-filling section 14 and the optical fibers 3 are caused to abut onto this solid refractive index-matching material 7. The adhesive 5 is filled in the adhesive-filling section 14.

Although the tapered part is not disposed at an optical fiber hole 12', the tapered part may be disposed in one or more embodiments.

In one or more embodiments, causing the optical fibers 3 to abut onto the solid refractive index-matching material 7 deforms the surface of the sheet-shaped solid refractive index-matching material 7 according to the end surfaces of the optical fibers 3. This can reduce forming of air bubbles and can reduce the signal loss of the optical signal. Since the sheet-shaped solid refractive index-matching material 7 has the viscosity, the peeling of the optical fiber 3 can be reduced.

While the above-described embodiments use the sheet-shaped solid refractive index-matching material 7, this should not be constructed in a limiting sense. For example, the solid refractive index-matching material 7 may be constituted of an optical adhesive. The following describes this point.

<Configuration>

FIG. 11A is a cross-sectional view of a fiber-attached ferrule of one or more embodiments. FIG. 11B is a cross-sectional view of a comparative example.

The boot 26 includes an adhesive-filling section 26A (see the dotted lines in FIG. 11A and FIG. 11B). A hardening adhesive (for example, an ultraviolet cure adhesive and a thermosetting adhesive) is filled to the adhesive-filling section 26A of the boot 26. A fixing adhesive 6 filled in the adhesive-filling section 26A is an adhesive to fix the optical fibers 3 inserted through the optical fiber holes 12 to the optical fiber holes 12. By the filling with the fixing adhesive 6, the fixing adhesive 6 is permeated, for example, between the boot 26 and the optical fibers 3, between the boot 26 and the ferrule 1 (the inner wall surface of the boot hole 13), and between the optical fiber holes 12 and the optical fibers 3. Hardening the permeated fixing adhesive 6 fixes these members with the fixing adhesive 6, and the optical fibers 3 are fixed to the optical fiber holes 12, thus the optical fibers 3 being fixed to the ferrule 1. The optical fibers 3 may be directly fixed to the optical fiber holes 12 (the ferrule 1) by being bonded to the optical fiber holes 12. Alternatively, the optical fibers 3 may be indirectly fixed to the optical fiber holes 12 (the ferrule 1) by bonding the boot 26 to the ferrule 1 and bonding the optical fibers 3 to the boot 26. Consequently, even when the optical fibers 3 are pulled from the ferrule 1, the optical fibers 3 can be kept at the ferrule 1. In other words, the fixing adhesive 6 has a mechanical property enough to keep the optical fibers 3 at the ferrule 1. In view of this, the fixing adhesive 6 is a comparatively hard adhesive when hardened.

As already described above, the ferrule 1 includes the adhesive-filling section 14. By filling the adhesive-filling section 14 with the adhesive, the adhesive is filled to the peripheral areas of the end portions of the optical fibers 3, which protrude from the optical fiber hole opening surface 14B, and the adhesive is permeated into the gap between the end surfaces of the optical fibers 3 and the abutting surface 14C. The adhesive functioning as the refractive index-matching material enters the gap between the end surfaces of the optical fibers 3 and the abutting surface 14C, thus reducing transmission loss of the optical signals. Thus, the adhesive filled in the adhesive-filling section 14 becomes the solid refractive index-matching material through hardening.

The adhesive-filling section 14 is filled with the hardening adhesive (for example, the ultraviolet cure adhesive and the thermosetting adhesive). When the adhesive-filling section 14 is open to the top surface of the ferrule 1, in the case where the hardened adhesive contracts, the ferrule 1 deforms such that the optical fiber opening surface 14B becomes close to the abutting surface 14C on the upper side (the opening side of the adhesive-filling section 14) of the ferrule 1. However, since the ferrule 1 has a bottom wall, the ferrule 1 does not deform on the lower side of the ferrule 1. Consequently, as indicated by the dotted line in FIG. 11B, the ferrule 1 deforms so as to warp. A cause of contraction of the adhesive includes, for example, a high temperature, high humidity environment, and the hardening of the adhesive. Such deformation of the ferrule 1 is likely to occur as the adhesive-filling section 14 deepens. Specifically, in the case where the depth of the adhesive-filling section 14 (the dimension in the up-down direction) is equal to or more than a half of the thickness (the dimension in the up-down direction) of the body portion 10 of the ferrule 1, the deformation of the ferrule 1 illustrated in FIG. 11B is likely to occur.

With the comparative example, as illustrated in FIG. 11B, the adhesive filled in the adhesive-filling section 14 of the ferrule 1 is the fixing adhesive 6 identical to the adhesive filled in the adhesive-filling section 26A of the boot 26. As already described above, this fixing adhesive 6 is an adhesive with a strength sufficient enough to keep the optical fibers 3 to the ferrule 1 and is a comparatively hard adhesive when hardened. Accordingly, as indicated by the dotted line in FIG. 11B, in the case where the ferrule 1 deforms so as to warp, the end surfaces of the optical fibers 3 peel off from the abutting surface 14C. Consequently, a peeling layer (the air layer) is formed between the end surfaces of the optical fibers 3 and the abutting surface 14C, possibly resulting in increase in transmission loss. The ordinary MT ferrule (the optical connector specified by JIS C5981) has the optical fiber end surfaces exposed from the ferrule end surface. In the MT ferrule, the optical fiber end surfaces are not caused to abut onto the inner wall (the abutting surface 14C) of the adhesive-filling section 14 like in one or more embodiments. Therefore, supposing that the adhesive in the adhesive-filling section 14 contracts and causes the ferrule to deform so as to warp, peeling off between the optical fiber end surfaces and the abutting surface 14C does not occur in one or more embodiments. In view of this, peeling off of the optical fiber end surfaces is specific to the structure like the comparative example and one or more embodiments where the optical fiber end surfaces are caused to abut onto the inner wall of the adhesive-filling section 14 (the abutting surface 14C).

In one or more embodiments, as illustrated in FIG. 11A, the optical adhesive 5 filled in the adhesive-filling section 14 of the ferrule 1 is the adhesive different from the fixing adhesive 6, which is filled in the adhesive-filling section 26A of the boot 26, and is the adhesive having a flexible property compared with the fixing adhesive 6. Accordingly, the optical adhesive 5 has properties that reduce the deformation of the ferrule 1 and reduces the peeling of the optical fiber end surfaces from the abutting surface 14C. That is, since the optical adhesive 5 is the adhesive with the comparatively flexible property, the deformation of the ferrule 1 caused by the contraction of the adhesive like in the comparative example is less likely to occur, thereby ensuring reducing the increase in transmission loss. Supposing that the ferrule 1 deforms, the deformation of the comparatively flexible optical adhesive 5 can hold the state where the refractive index-matching material enters the gap between the optical fiber end surfaces and the abutting surface 14C, thereby ensuring reducing the increase in transmission loss. Thus, one or more embodiments can synergistically obtain the effect of reduction in transmission loss.

The optical adhesive 5 has the hardness lower than that of the fixing adhesive 6 (more flexible than the fixing adhesive 6). Specifically, while the fixing adhesive 6 after hardening has Shore hardness D of 80 to 85, the optical adhesive 5 after hardening has the Shore hardness D of equal to or less than 50. An environmental testing that changes the temperature in the order of −40° C., 25° C., and 75° C. to the fiber-attached ferrules 1 manufactured using the optical adhesive 5 with the Shore hardness D of equal to or less than 50 was performed. An amount of increase in loss of the optical fibers was measured in the environmental testing and evaluations were conducted on the basis of the amount of increase in loss. It has been confirmed that the maximum amount of increase in loss among the amounts of increase in loss of the plurality of optical fibers of the optical fiber ribbons was 1.0 dB in the comparative example and equal to or less than 0.3 dB in one or more embodiments. In the comparative example, the amount of increase in loss exceeded 0.3 dB in most optical fibers. That is, when the optical fiber with the amount of increase in loss of 0.3 dB or more is evaluated as "poor," while almost all the optical fibers are evaluated as "poor" in the comparative example, there were no optical fibers evaluated as "poor" in one or more embodiments.

The optical adhesive 5 is adjusted such that a difference in refractive index from the optical fiber 3 decreases due to reduction in Fresnel reflection. In contrast to this, the fixing adhesive 6 need not be the optical adhesive like the optical adhesive 5. In view of this, the fixing adhesive 6 may have optical transparency lower than the optical adhesive 5. Additionally, the difference in refractive index from the optical fiber 3 may be larger than the difference in refractive index between the optical fiber 3 and the optical adhesive 5. Thus, by differentiating the optical adhesive 5 from the fixing adhesive 6, a degree of freedom of selection of the fixing adhesive 6 and the optical adhesive 5 can be increased. The refractive index difference between the optical adhesive 5, which serves as the refractive index-matching material, and the optical fiber 3 may be equal to or less than 0.1 and possibly be equal to or less than 0.05. Meanwhile, the refractive index difference between the fixing adhesive 6 and the optical fiber 3 exceeding 0.1 is acceptable.

In one or more embodiments, as illustrated in FIG. 7A, the diameter of the optical signal at the recess site 15 is reduced thinner than the diameter of the optical signal at the lens section 16. As illustrated in FIG. 7B, the diameter of the optical signal may become larger with increasing separation compared with a distance to the lens section of the ferrule on the other side. In one or more embodiments as well, as illustrated in FIG. 8 and FIG. 9A to FIG. 9C, the elastic body 100 (the elastic member) surrounding the recess site 15 may be disposed on the ferrule end surface.

<Method for Manufacturing Fiber-Attached Ferrule 1>

Figure 12:
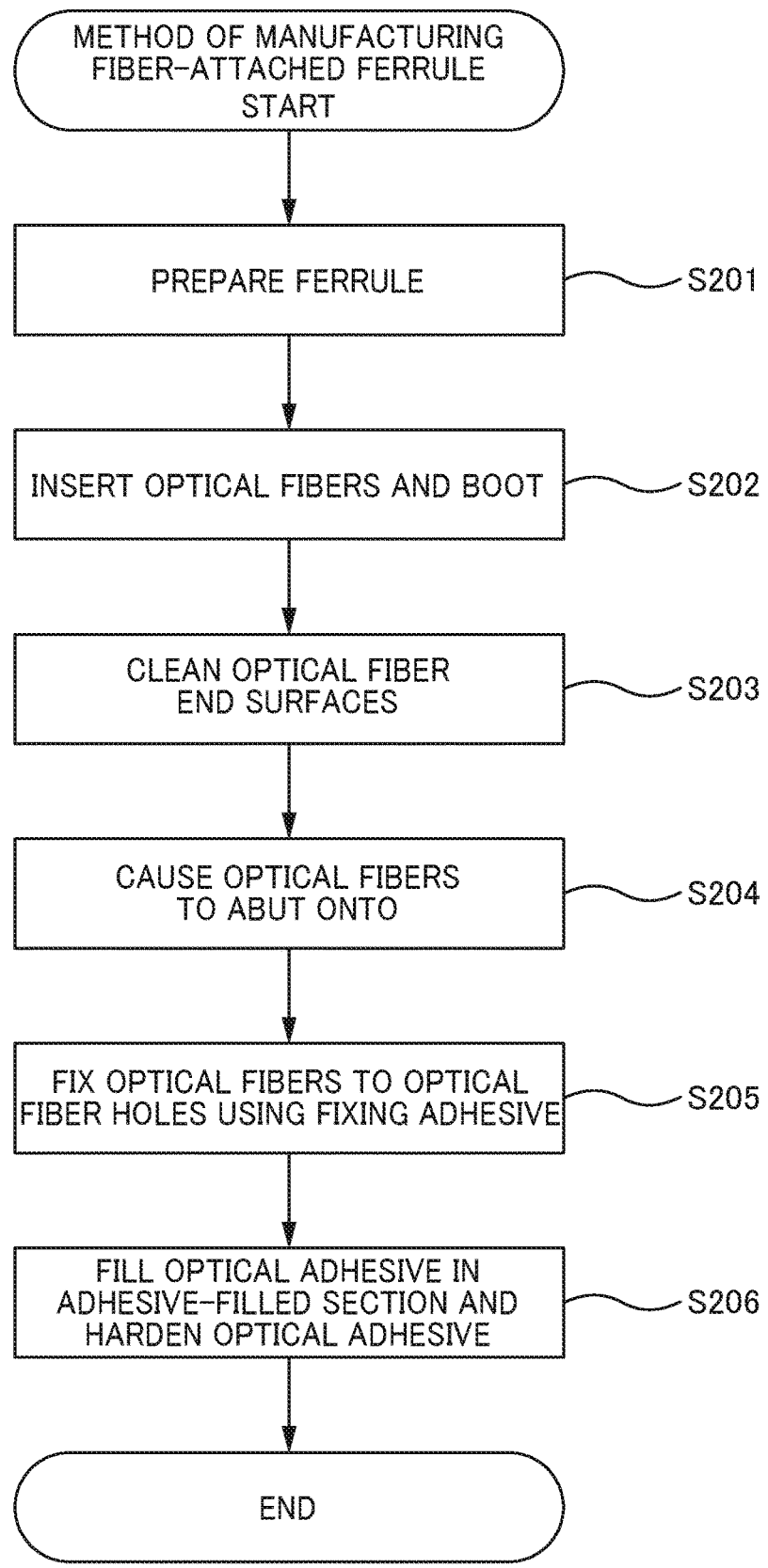
FIG. 12 is a flowchart for a manufacturing method (an assembly procedure) for the fiber-attached ferrule 1 of one or more embodiments.

FIG. 12 is a flowchart of the manufacturing method (the assembly procedure) for the fiber-attached ferrule 1 of one or more embodiments.

First, an operator prepares the ferrule 1 of one or more embodiments (S201). The operator inserts the respective optical fibers 3 of the optical fiber ribbons where the boot 26 is preliminary inserted to the optical fiber holes 12 on the ferrule 1 and inserts the boot 26 into the boot hole 13 of the ferrule 1 (S202). Then, the optical fiber end surfaces are protruded from the optical fiber hole opening surface 14B. Note that, at this phase, the optical fiber end surfaces do not abut onto the abutting surface 14C of the adhesive-filling section 14. This is because, when the optical fibers 3 are passed through the optical fiber holes 12, the dust and the like are possibly attached to the optical fiber end surfaces.

Next, the operator cleans the optical fiber end surfaces protruded from the optical fiber hole opening surface 14B of the adhesive-filling section 14 (S203). For example, the operator sprays air from the opening on the adhesive-filling section 14 to blow off the dust on the optical fiber end surfaces. This allows removing the dust on the optical fiber end surfaces attached during insertion to the optical fiber holes 12. To thus remove the dust on the optical fiber end surfaces, the optical adhesive 5 is filled in the adhesive-filling section 14 after the insertion of the optical fibers 3, not filled in advance before the insertion of the optical fibers 3.

After cleaning the optical fiber end surfaces, the operator slides the optical fibers 3 (the optical fiber ribbons) forward with respect to the boot 26 to cause the optical fiber end surfaces to abut onto the abutting surface 14C of the adhesive-filling section 14 (S204). When the optical fiber end surfaces are caused to abut onto the abutting surface 14C, the entire region of the optical fiber end surfaces do not always contact the abutting surface 14C. In the case where the plurality of optical fibers 3 vary in the length, even when a part of a certain optical fiber end surface is in contact with the abutting surface 14C, another optical fiber end surface may be closing to the abutting surface 14C but may not be in contact with the abutting surface 14C. In view of this, at this phase, an air layer is present between the optical fiber end surface and the abutting surface 140.

Next, the operator fixes the optical fibers 3 to the ferrule 1 using the fixing adhesive 6 with the optical fiber end surfaces being caused to abut onto the abutting surface 14C of the adhesive-filling section 14 (the optical fiber end surfaces are caused to close to the abutting surface 14C) (S205). At this time, the operator fills the adhesive-filling section 26A disposed in the boot 26 (see the dotted line in FIG. 11A) with the thermosetting fixing adhesive 6 and permeates the adhesive up to between the optical fiber holes 12 and the optical fibers 3. The fixing adhesive 6 may be filled to the adhesive-filling section 26A (see the dotted line in FIG. 11A) of the boot 26 and the fixing adhesive 6 may be permeated between the boot 26 and the optical fibers 3, and between the boot 26 and the ferrule 1 (the inner wall surface of the boot hole 13), and the like. After permeating the thermosetting fixing adhesive 6 to the respective portions, the operator heats the fixing adhesive 6 to harden the fixing adhesive 6. Thus, the optical fibers 3 are bonded and fixed to the ferrule 1. A method for applying the fixing adhesive 6 is not limited to the use of the adhesive-filling section 26A. The fixing adhesive 6 does not have to be the thermosetting adhesive.

Next, the operator fills the optical adhesive 5 in the adhesive-filling section 14 and hardens the optical adhesive 5 (S206). Filling the adhesive-filling section 14 with the optical adhesive 5 permeates the optical adhesive 5 to the gap between the end surfaces of the optical fibers 3 and the abutting surface 140. A capillarity of the optical adhesive 5 permeates the optical adhesive 5 between the optical fiber end surfaces and the abutting surface 14C; therefore, the air bubble is less likely to remain between the optical fiber end surfaces and the abutting surface 140. After filling the thermosetting optical adhesive 5 in the adhesive-filling section 14, the operator heats the optical adhesive 5 and hardens the optical adhesive 5. The optical adhesive 5 does not have to be the thermosetting adhesive and may be, for example, an ultraviolet-curing adhesive.

The completion of hardening of the optical adhesive 5 filled in the adhesive-filling section 14 completes the fiber-attached ferrule 1 of one or more embodiments.

With the above-described method of manufacturing the fiber-attached ferrule 1, the operator temporarily fixes the optical fibers 3 to the ferrule 1 at S205. After that, at S206, the operator performs work to fill the adhesive-filling section 14 with the optical adhesive 5 and harden the optical adhesive 5. This eases the work to fill the adhesive-filling section 14 with the optical adhesive 5 and the work to harden the optical adhesive 5. In contrast to this, supposing that the optical fibers 3 are not fixed to the ferrule 1 during the work at S206, this makes the work to fill the adhesive-filling section 14 with the optical adhesive 5 while maintaining the state of the optical fiber end surfaces being caused to abut onto the abutting surface 14C (the state where the optical fiber end surfaces are caused to come close to the abutting surface 14C) difficult.

With the above-described method of manufacturing the fiber-attached ferrule 1, after the fixing adhesive 6 hardens at S205, the operator fills the adhesive-filling section 14 with the optical adhesive 5 at S206. This allows preventing the fixing adhesive 6 and the optical adhesive 5 from being mixed. Supposing that the fixing adhesive 6 and the optical adhesive 5 are simultaneously filled, the fixing adhesive 6 and the optical adhesive 5 permeate and are mixed in the optical fiber holes 12. Consequently, the adhesive strength of the optical fiber 3 with the optical fiber hole 12 is possibly deteriorated.

The above-described method of manufacturing the fiber-attached ferrule 1 fills the adhesive-filling section 14 with the optical adhesive 5 more flexible than the fixing adhesive 6. This allows reducing the deformation of the ferrule 1 due to the hardening of the optical adhesive 5, thereby ensuring reducing the transmission loss. Supposing that the ferrule 1 deforms, the deformation of the comparatively flexible optical adhesive 5 ensures holding the state where the optical adhesive 5 enters into the gap between the optical fiber end surfaces and the abutting surface 14C, thus ensuring reducing the increase in transmission loss. Thus, the effect of reduction in transmission loss can be synergistically obtained.

<Modifications>

When the adhesive-filling section 14 is filled with the optical adhesive 5 (S206), the plurality of end surfaces of the optical fibers 3 are caused to abut onto the abutting surface 140. Accordingly, the plurality of optical fibers 3 serve as barriers at the inside of the adhesive-filling section 14. The optical adhesive 5 is likely to accumulate on the upper portions of the plurality of optical fibers 3. Consequently, the optical adhesive 5 accumulated on the upper portions of the plurality of optical fibers 3 blocks the adhesive-filling section 14. This makes it difficult for the optical adhesive 5 to reach the lower side of the adhesive-filling section 14 and the air bubble is possibly formed at the bottom of the adhesive-filling section 14. Therefore, a ventilation hole may be formed between the bottom surface of the adhesive-filling section 14 and the lower surface of the ferrule 1.

FIG. 13A is a cutaway perspective view of the ferrule 1 of a first modification of one or more embodiments. FIG. 13B is an overall perspective view of the ferrule 1 of the first modification of one or more embodiments.

The ferrule 1 of this first modification includes ventilation holes 14D at the bottom of the adhesive-filling section 14. Since the optical adhesive 5 has a physical property to the extent of not causing a leakage from the opening on the adhesive-filling section 14, configuring the opening of the ventilation holes 14D smaller than the opening on the upper side of the adhesive-filling section 14 does not cause the leakage of the optical adhesive 5 from the ventilation holes 14D. In the case where the ventilation holes 14D are disposed at the bottom surface of the adhesive-filling section 14, the air bubble is less likely to be formed at the bottom of the adhesive-filling section 14. Additionally, an effect that the work time taken for filling the adhesive-filling section 14 with the optical adhesive 5 can be shortened is obtained.

In the modification illustrated in FIG. 13A and FIG. 13B, although the plurality of small ventilation holes 14D are arranged in the right-left direction, the ventilation hole 14D may be one or may be an opening elongated in the right-left direction. The ventilation hole 14D is not opened from the lower surface of the ferrule 1 but may be formed so as to open from the side surface (the side surface in the right-left direction) of the ferrule 1.

FIG. 14A and FIG. 14B are overall perspective views of the ferrule 1 of a second modification of one or more embodiments. FIG. 15A is a cross-sectional view of the ferrule 1 of the second modification of one or more embodiments. FIG. 15B is a cross-sectional view of the fiber-attached ferrule 1 of the second modification of one or more embodiments.

With this second modification, the adhesive-filling section 14 is formed with a lower side opening 14E on the bottom. The lower side opening 14E is a site opening to the lower surface of the body portion 10 of the ferrule 1. The lower side opening 14E opens so as to have a rectangular shape elongated in the right-left direction in the lower surface of the body portion 10 of the ferrule 1. In view of this, the adhesive-filling section 14 of the second modification penetrates the ferrule 1 in the up-down direction (the thickness direction of the ferrule 1). An act of a surface tension with the optical adhesive 5 prevents the leakage of the optical adhesive 5 from the opening of the lower side opening 14E to the lower side. In other words, the lower side opening 14E has the size at which the optical adhesive 5 does not leak to the lower side of the lower side opening 14E by the act of the surface tension of the optical adhesive 5.

As already described above, in the case where the adhesive-filling section 14 opens only to the upper side like the comparative example (see FIG. 11B), the contraction of the adhesive filled in the adhesive-filling section 14 deforms the ferrule 1 such that the optical fiber opening surface 14B closes to the abutting surface 14C on the open upper side of the ferrule 1. However, since the ferrule 1 has the bottom wall, the ferrule 1 does not deform on the lower side of the ferrule 1. Consequently, as indicated by the dotted line in FIG. 11B, the ferrule 1 deforms so as to warp.

In contrast to this, with the second modification, the lower side opening 14E opens in the lower surface of the ferrule 1, and the bottom wall of the ferrule 1 is not disposed to the lower side opening 14E. In view of this, with the second modification, when the ferrule 1 defaults such that the optical fiber opening surface 14B comes close to the abutting surface 14C on the upper side of the ferrule 1 by a contractile force of the optical adhesive 5, the ferrule 1 is also deformable such that the optical fiber opening surface 14B comes close to the abutting surface 14C at the lower side opening 14E as well. Accordingly, with the second modification, supposing that the optical adhesive 5 in the adhesive-filling section 14 contracts, since the contractile force of the optical adhesive 5 acts on both the upper portion and the lower portion of the ferrule 1, the deformation so as to warp the ferrule 1 can be further reduced. With the second modification, the deformation of the ferrule 1 so as to warp can be reduced. Accordingly, the optical fiber end surfaces are further less likely to peel off from the abutting surface 14C, ensuring further reducing of the transmission loss of the optical signal.

With the second modification illustrated in FIG. 14B, the width of the lower side opening 14E in the right-left direction (the interval between the left inner wall and the right inner wall of the lower side opening 14E) is set wider than the row width of the plurality of fiber holes 12 arranged in the right-left direction (the interval between the optical fiber hole 12 on the leftmost end and the optical fiber hole 12 on the rightmost end: optical fiber hole row width). Accordingly, when the optical adhesive 5 filled in the adhesive-filling section 14 contracts, the contractile force from the adhesive 5 acts on the ferrule 1 on both sides of the upper portions and the lower portions of the respective optical fibers 3; therefore, the deformation of the ferrule 1 so as to warp can be reduced. Note that, as long as the width of the lower side opening 14E in the right-left direction is equal to or more than a half of the optical fiber hole row width, the effect of reducing the deformation of the ferrule 1 can be obtained.

OTHERS

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1 ferrule, 3 optical fiber,
5 adhesive (optical adhesive), 6 fixing adhesive,
7 solid refractive index-matching material,
10 body portion, 10' body portion,
10A ferrule end surface, 10B flange part,
11 guide pin hole, 12 optical fiber hole, 12' optical fiber hole,
12A tapered part, 12B fiber fixing part,
13 boot hole, 14 adhesive-filling section,
14A upper opening, 14B optical fiber hole opening surface,
14C abutting surface, 14D ventilation hole,
14E lower side opening,
15 recess site, 16 lens section,
18 light transmitting part, 19 reflective section,
20 housing, 22 guide pin,
24 spring, 26 boot,
30 photoelectric conversion module, 32 light element

The invention claimed is:

1. An optical-fiber-attached ferrule, comprising:
an optical fiber; and
a ferrule that holds an end portion of the optical fiber, wherein
the ferrule comprises:
a ferrule end surface,
an optical fiber hole into which the optical fiber is inserted,
an adhesive-filling section that comprises an opening surface of the optical fiber hole and an opposed surface opposed to the opening surface, and
a light transmitting part that transmits an optical signal between the ferrule end surface and the opposed surface,
an end surface of the optical fiber is disposed close to the opposed surface in the adhesive-filling section,
the adhesive-filling section is filled with an optical adhesive with Shore hardness D of equal to or less than 50,
the adhesive-filling section further comprises an upper opening in an upper side of the ferrule for filling and at least one ventilation hole that opens on a bottom side of the ferrule, disposed at a bottom of the adhesive-filling section, and
an adhesive used to fix the optical fiber to the optical fiber hole is different from the optical adhesive.

2. The optical-fiber-attached ferrule according to claim 1, wherein
the adhesive-filling section has a depth equal to or more than a half of a thickness of a ferrule body section.

3. The optical-fiber-attached ferrule according to claim 1, wherein
the adhesive used to fix the optical fiber to the optical fiber hole is harder than the optical adhesive.

4. The optical-fiber-attached ferrule according to claim 1, wherein
a difference in refractive index of the adhesive used to fix the optical fiber to the optical fiber hole and refractive index of the optical fiber is larger than a difference in refractive index of the optical adhesive and refractive index of the optical fiber.

5. The optical-fiber-attached ferrule according to claim 1, comprising:
a recess site recessed with respect to the ferrule end surface; and
lens sections formed at the recess site, wherein each of the lens sections is disposed to correspond to each of a plurality of optical fiber holes.

6. The optical-fiber-attached ferrule according to claim 5, wherein
the optical signal has a diameter at the recess site reduced thinner than a diameter of the optical signal at the lens section, and
the diameter of the optical signal becomes larger with increasing separation compared with a distance to a lens section on a ferrule on another side.

7. The optical-fiber-attached ferrule according to claim 5, wherein
the ferrule end surface comprises an elastic member surrounding the recess site.

8. The optical-fiber-attached ferrule according to claim 1, wherein
the adhesive-filling section penetrates the ferrule.

9. The optical-fiber-attached ferrule according to claim 1, wherein the at least one ventilation hole is smaller than the upper opening.

10. The optical-fiber-attached ferrule according to claim 1, wherein the at least one ventilation hole comprises a plurality of ventilation holes that are arranged in a width direction of the ferrule.

11. The optical-fiber-attached ferrule according to claim 1, wherein the at least one ventilation hole is elongated in a width direction of the ferrule.

12. The optical-fiber-attached ferrule according to claim 1, wherein the at least one ventilation hole has a size where the optical adhesive does not leak to a lower side of the at least one ventilation hole by an act of a surface tension of the optical adhesive.

13. The optical-fiber-attached ferrule according to claim 1, wherein the ferrule is integrally molded with a resin that transmits optical signals.

14. A method of manufacturing an optical-fiber-attached ferrule, comprising:
  preparing a ferrule that comprises:
    a ferrule end surface,
    a fiber hole,
    an adhesive-filling section that has an opening surface of the fiber hole and an opposed surface opposed to the opening surface, and
    a light transmitting part that transmits an optical signal between the ferrule end surface and the opposed surface;
  inserting an optical fiber into the fiber hole and causing an end surface of the optical fiber protruding from the opening surface to come close to the opposed surface;
  fixing the optical fiber to the fiber hole with a first adhesive while the end surface of the optical fiber is caused to come close to the opposed surface; and
  filling an optical adhesive with Shore hardness D of equal to or less than 50 in the adhesive-filling section after fixing the optical fiber,
  wherein the optical adhesive is different from the first adhesive, and
  the adhesive-filling section further comprises an upper opening in an upper side of the ferrule for filling and at least one ventilation hole that opens on a bottom side of the ferule, disposed at a bottom of the adhesive-filling section.

* * * * *